United States Patent
Mehrotra

(10) Patent No.: US 7,085,420 B2
(45) Date of Patent: Aug. 1, 2006

(54) TEXT DETECTION IN CONTINUOUS TONE IMAGE SEGMENTS

(75) Inventor: Sanjeev Mehrotra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 608 days.

(21) Appl. No.: 10/186,887

(22) Filed: Jun. 28, 2002

(65) Prior Publication Data

US 2004/0001634 A1 Jan. 1, 2004

(51) Int. Cl.
*G06K 9/36* (2006.01)
*G06K 9/34* (2006.01)

(52) U.S. Cl. .................. 382/232; 382/178; 382/234
(58) Field of Classification Search ............. 382/232, 382/242, 243, 178–179, 234
See application file for complete search history.

(56) References Cited

U.S. PATENT DOCUMENTS

| | | |
|---|---|---|
| 5,043,919 A | 8/1991 | Callaway et al. |
| 5,258,836 A | 11/1993 | Murata |
| 5,266,941 A | 11/1993 | Akeley et al. |
| 5,394,170 A | 2/1995 | Akeley et al. |
| 5,517,327 A | 5/1996 | Nakatani et al. |
| 5,586,200 A | 12/1996 | Devaney et al. |
| 5,594,504 A | 1/1997 | Ebrahimi |
| 5,598,215 A | 1/1997 | Watanabe |
| 5,764,814 A | 6/1998 | Chen et al. |
| 5,912,991 A | 6/1999 | Jeon et al. |
| 5,946,419 A | 8/1999 | Chen et al. |
| 6,026,182 A | 2/2000 | Lee et al. |
| 6,075,875 A | 6/2000 | Gu |
| 6,188,777 B1 | 2/2001 | Darrell et al. |
| 6,226,407 B1 | 5/2001 | Zabih et al. |
| 6,400,831 B1 | 6/2002 | Lee et al. |
| 6,421,738 B1 | 7/2002 | Ratan et al. |
| 6,573,915 B1 | 6/2003 | Sivan et al. |
| 6,650,705 B1 | 11/2003 | Vetro et al. |
| 6,654,419 B1 | 11/2003 | Sriram et al. |
| 6,711,278 B1 | 3/2004 | Gu et al. |
| 6,728,317 B1 | 4/2004 | Demos |
| 2002/0176624 A1 | 11/2002 | Kostrzewski et al. |

OTHER PUBLICATIONS

Chadda, N., "Segmentation-Assisted Compression of Multimedia Documents", *1996 Conference Record of the 29th Asilomar Conference on Signals, Systems and Computers*, vol. 2, 1996: 1452-1456.

(Continued)

*Primary Examiner*—Duy M. Dang
(74) *Attorney, Agent, or Firm*—Klarquist Sparkman, LLP

(57) ABSTRACT

For encoding of mixed-mode images containing text and continuous-tone content, the pixels in the image that form the text content are detected and separated. Text detection classifies pixels as text or continuous tone content by accumulating pixel counts for groups of contiguous, non-smooth pixels with the same color. Groups whose pixel count exceeds a threshold are classified as text. The text detection technique further reduces classification errors by testing for boundary dimensions and pixel density of the group characteristic of long straight lines or large borders. The text detection technique further searches the neighborhood of groups qualifying as text for pixels of the same color, so as to also detect pixels for isolated text marks like dots, accents or punctuation. The separated text and continuous-tone content can be encoded separately for efficient compression while preserving text quality, and the text again superimposed on the continuous tone content at decompression.

36 Claims, 13 Drawing Sheets

OTHER PUBLICATIONS

Perlmutter et al., "Text Segmentation in Mixed-Mode Images Using Classification Trees and Transform Tree-Structured Vector Quantization", *Conference Proceeding, 1996 IEEE International Conference on Acoustics, Speech and Signal Processing*, vol. 4, 1996: 2231-2234.

Chaddha et al., "Text Segmentation Using Linear Transforms", *1996 Conference Record of the 29th Asilomar Conference on Signals, Systems and Computers*, vol. 2, 1996: 1447-1451.

Chaddha et al., "Text Segmentation Using Mixed-Mode Images", *1994 Conference Record of the 28th Asimolar Conference on Signals, Systems and Computers*, vol. 2, 1994: 1356-1361.

Schaar-Mitrea et al., "Hybrid Compression of Video With Graphics in DTV Communication Systems", *IEEE Transactions on Consumer Electronics*, vol. 46, No. 4:1007-1017, Nov. 2000.

Biggar et al., "Segmented Video Coding", *IEEE Int. Conf on Acoustics, Speech and Sig. Proc., ICASSP-88, New York*, pp. 1108-1111 (Apr. 1988).

Black, "Combining Intensity and Motion for Incremental Segmentation and Tracking Over Long Image Sequences,", *ECCV '92*, Santa Margherita, Italy, pp. 485-493 (May 1992).

Brady et al., "Object Detection and Tracking Using An Em-Based Motion Estimation and Segmentation Framework," *ICIP '96*, Lausanne, Switzerland, vol. 1, pp. 925-928 (Sep. 1996).

Burt et al., "Segmentation and Estimation of Image Region Properties Through Cooperative Hierarchical Computation," *IEEE Transactions on Systems, Man, and Cybernetics*, vol. SMC-11, No. 12, pp. 802-809 (Dec. 1981).

Canny, "A Computational Approach to Edge Detection," *IEEE Transactions on Pattern Analysis and Machine Intelligence*, vol. PAMI-8, No. 6, pp. 679-698 (Nov. 1986).

Chen et al., "Image-Segmentation as an Estimation Problem," *Computer Graphics and Image Processing*, vol. 12, pp. 153-172 (1980).

Cover et al., "Nearest Neighbor Pattern Classification," *IEEE Transactions on Information Theory*, vol. IT-13, No. 1, pp. 21-27 (Jan. 1967).

Deriche et al., "Tracking Line Segments," *ECCV'90*, pp. 259-268 (1990).

Gill et al., "Creating High-Quality Content with Microsoft Windows Media Encoder 7," 4 pp. (2000). [Downloaded from the World Wide Web on May 1, 2002.].

Gu et al., "Combined Gray-Level and Motion Segmentation for Very Low Bit-Rate Coding," *SPIE*, vol. 2451, pp. 121-129 (Mar. 1995).

Haralick, et al., "Image Segmentation Techniques," *Computer Vision, Graphics and Image Processing*, vol. 29, pp. 100-132 (1985).

Horowitz et al., "Picture Segmentation by a tree traversal algorithm," *J. ACM*, vol. 23, No. 2, pp. 368-388 (1976).

Li et al., "Optimal Linear Interpolation Coding for Server-Based Computing," *Proc. IEEE Int'l Conf. on Communications*, 5 pp. (Apr.-May 2002).

Matthias, "An Overview of Microsoft Windows Media Screen Technology," 3 pp. (2000). [Downloaded from the World Wide Web on May 1, 2002.].

Meyer, "Color Image Segmentation," *4th International Conference on Image Processing and its Applications*, pp. 303-306 (May 1992).

Palmer et al., "Shared Desktop: A Collaborative Tool for Sharing 3-D Applications Among Differentiation Window Systems," *Digital Tech. Journal*, v. 9, No. 3, pp. 42-49 (1997).

Pipitone et al., "Tripod operators for recognizing objects in range images: rapid rejection of library objects," *Proceedings of the 1992 IEEE International Conference on Robotics and Automation* (May 1992).

OPTX International, "OPTX Improves Technology-Based Training with Screen Watch™ 3.0. Versatile Screen Capture Software Adds High Color and Live Webcast Support," 1 p., document marked Feb. 15, 2001 [downloaded from the World Wide Web on Sep. 22, 2005].

OPTX International, "OPTX International Marks One Year Anniversary of Screen Watch With Release of New 2.0 Version," 1 p., document marked May 16, 2000 [downloaded from the World Wide Web on Sep. 22, 2005].

OPTX International, "New Screen Watch™ 4.0 Click and Stream™ Wizard From OPTX International Makes Workplace Communication Effortless," 1 p., document marked Sep. 24, 2001 [downloaded from the World Wide Web on Sep. 22, 2005].

Salembier et al., "Segmentation-Based Video Coding System Allowing the Manipulation of Objects," *IEEE Transactions on Circuits and Systems for Video Technology*, vol. 7, No. 1, pp. 60-73 (Feb. 1997).

"Sun Microsystems and Thalia Products, Inc. to Collaborate to Co-Develop Network Software and Protocols for the Home", 2 pp. (Document dated Oct. 19, 2000) [Downloaded from the World Wide Web on Oct. 4, 2005].

Techsmith Corporation, "Techsmith Camtasia Screen Recorder SDK," 2 pp. (2001).

Techsmith Corporation, "Camtasia Feature of the Week: Quick Capture," 2 pp. (Downloaded from the World Wide Web on May 9, 2002; document dated Jan. 4, 2001).

Techsmith Corporation, "Camtasia Screen Recorder SDK DLL API User Guide," version 1.0, 66 pp. (2001).

Techsmith Corporation, "Camtasia v3.0.1—README. TXT," 19 pp. (Jan. 2002).

Zhong et al., "AMOS: an active system for MPEG-4 video object segmentation," *ICIP '98*, Chicago, vol. 2, pp. 647-651 (1998).

Quieroz et al., "Optimizing Block-Thresholding Segmentation for Multilayer Compression of Compound Images," *IEEE Transactions on Image Processing*, vol. 9, No. 9, pp. 1461-1471 (Sep. 2000).

Said, et al., "Simplified Segmentation for Compound Image Compression," *1999 International Conf. on Image Processing (ICIP '99)*, vol. 1, pp. 229-233, Kobe, Japan (Oct. 1999).

Software 380 Implementing a Screen Capture Tool with Text Detection and Segmentation

| 0 | 0 | 0  | 0  | 0  | 0  | 0  | 0 | 0 |
|---|---|----|----|----|----|----|---|---|
| 0 | 0 | 1  | 2  | 3  | 4  | 5  | 0 | 0 |
| 0 | 0 | 6  | 7  | 7  | 7  | 8  | 0 | 0 |
| 0 | 0 | 9  | 10 | 7  | 11 | 12 | 0 | 0 |
| 0 | 0 | 0  | 13 | 7  | 14 | 0  | 0 | 0 |
| 0 | 0 | 0  | 15 | 7  | 16 | 0  | 0 | 0 |
| 0 | 0 | 17 | 18 | 7  | 16 | 19 | 0 | 0 |
| 0 | 0 | 20 | 7  | 7  | 7  | 21 | 0 | 0 |
| 0 | 0 | 22 | 23 | 24 | 25 | 26 | 0 | 0 |
| 0 | 0 | 0  | 0  | 0  | 0  | 0  | 0 | 0 |

1030:

| GROUP | COUNT |
|-------|-------|
| 1  | 1  |
| 2  | 1  |
| 3  | 1  |
| 4  | 1  |
| 5  | 1  |
| 6  | 1  |
| 7  | 10 |
| 8  | 1  |
| 9  | 1  |
| 10 | 1  |
| 11 | 1  |
| 12 | 1  |
| 13 | 1  |
| 14 | 1  |
| 15 | 1  |
| 16 | 2  |
| 17 | 1  |
| 18 | 1  |
| 19 | 1  |
| 20 | 1  |
| 21 | 1  |
| 22 | 1  |
| 23 | 1  |
| 24 | 1  |
| 25 | 1  |
| 26 | 1  |

TEXT DETECTION IN CONTINUOUS TONE IMAGE SEGMENTS

TECHNICAL FIELD

The invention relates to compression of mixed-mode images, particularly images with continuous tone color content and textual content. The invention also relates to detection and separation of the textual content pixels from within a continuous tone background in an image.

BACKGROUND

A variety of commonly encountered images are composed of mixed-mode content. In particular, many images have mixed textual and continuous tone content, such as where text appears over a background picture or photograph. Examples of multi-media applications where such images are common include computer screen capture (e.g., capturing images of the Microsoft Windows operating system's desktop or like computer displays, which can typically include icons with text labels over a background photograph), educational videos, and color facsimile, among others.

Digital images typically are compressed to reduce storage and transmission costs in computers and other consumer electronics and signal processing devices. Many image compression algorithms apply a block-based linear transform (e.g., the discrete cosine transform (DCT) used in the JPEG, MPEG and H.261 compression standards) with quantization of high-frequency transform coefficients to achieve lossy compression of image data. A drawback of this approach when applied to mixed-mode images is that the quantization of high frequency transform coefficients has the effect of distorting or blurring the textual content in a mixed-mode image, because the edges of text characters are discontinuous in color with respect to a background continuous tone picture and quantization tends to blur such locations of high color variation. The blurred edges of text characters can be readily perceptible to the viewer.

Various authors have proposed approaches to compressing mixed-mode images using text segmentation, including K. O. Perlmutter, N. Chaddha, J. B. Buckheit, R. M. Gray, and R. A. Olshen, "Text segmentation in mixed-mode images using classification trees and transform tree-structured vector quantization," in Proceedings of the IEEE International Conference on Acoustics, Speech and Signal Processing, vol. 4, pp. 2231–2234, 1996; N. Chaddha, "Segmentation-Assisted Compression Of Multimedia Documents," in Conference Record of the Twenty-Ninth Asilomar Conference on Signals, Systems and Computers, vol. 2, pp. 1452–1456, 1996; N. Chaddha and A. Gupta, "Text Segmentation Using Linear Transforms," in Conference Record of the Twenty-Ninth Asilomar Conference on Signals, Systems and Computers, vol. 2, pp. 1447–1451, 1996; and N. Chaddha, R. Sharma, A. Agrawal and A. Gupta, "Text Segmentation In Mixed-Mode Images," in Conference Record of the Twenty-Eighth Asilomar Conference on Signals, Systems and Computers, vol. 2, pp. 1356–1361, 1994. In general, the approaches described by these authors involve classifying a transform block within the image to be either a text segment or non-text based on characteristics of the block's transform coefficients (e.g., using the discrete cosine transform (DCT) or discrete wavelet transform (DWT)), and using different (higher quality) compression parameters (quantization matrices and entropy codes) for blocks classified as text than for non-text blocks.

A problem with these text segmentation approaches is that the block classified as containing text often is still composed of mixed mode content: text and a continuous tone background picture. The use of higher quality compression parameters for such blocks sacrifices compression of the continuous tone content of the block. On the other hand, the extent to which the compression of such blocks remains lossy can still lead to perceptible degradation in quality of the text content.

SUMMARY

In mixed-mode images composed of text and a continuous tone background, the text generally consists of strands of a large number of contiguous, same-colored pixels. By contrast, pixels for the continuous tone content generally are not equal in color value to neighboring pixels, but typically form a smooth color gradient. Further, the text color generally stands out from the color gradient of the continuous tone background. Techniques for text detection and segmentation described herein rely on these characteristics of text and continuous tone pixels to distinguish and separate the text content from within such mixed-mode images.

In an implementation of a basic text detection technique described herein, text detection is accomplished by finding pixels within a mixed-mode image that form strands of contiguous, same-colored pixels. The basic technique scans through the pixels of the mixed-mode image. Smooth pixels whose color value is a smooth gradient with its neighbors are classified as not text. For non-smooth pixels, the technique makes a count of any same colored pixels that are contiguous thereto. Pixels whose count of contiguous, same-colored pixels exceeds a threshold are identified as text pixels.

In an alternative implementation, the technique performs further analysis to account for certain exceptional situations not accounted for in the basic technique. For example, the basic technique may identify large square borders and large straight lines in the mixed-mode image as text pixels, and classify isolated text marks (e.g., dots on 'i' and 'j' characters, accent marks or punctuation) as not text. For borders and straight lines, this alternative technique also considers the bounding dimensions and pixel density of contiguous, same colored pixels. If a ratio of maximum to minimum bounding dimensions and the maximum dimension both exceed defined thresholds (indicative of a large straight line), the pixels are identified as not text. Similarly, if a pixel density is below a defined threshold (indicative of a large border), the pixels are identified as not text. For isolated textual marks, the technique searches a small local neighborhood of a text strand for other pixels having the same color value as the text strand, and also identifies any such other pixels as text.

In image compression applications, the text detection techniques can be used to perform text segmentation separating text pixels from continuous tone (e.g., background picture) pixels. Using the text detection technique, a separate buffer or image map of text pixels (which excludes the continuous tone content) is formed. The mixed-mode image is then encoded using an encoder suitable for continuous-tone content (e.g., a linear transform based codec ("encoder/decoder")), whereas the image map of text pixels is separately encoded using an encoder suitable for palettized content (e.g., a run-length encoding codec or other lossless image compression codec). The continuous-tone codec efficiently compresses the continuous tone content of the mixed-mode image. However, by separately encoding the text content using the palettized codec, the textual content is preserved. At decompression, the text content is losslessly reconstructed and superimposed on the decoded mixed-mode image. This has the benefit of more efficiently compressing the continuous tone content of the image without loss in quality of the text content.

Additional features and advantages will be made apparent from the following detailed description of illustrated embodiments, which proceeds with reference to the accompanying drawings.

BRIEF DESCRIPTION OF THE DRAWINGS

FIG. 8 is a diagram illustrating image maps of pixels, counts, and text classification for a portion of a mixed mode image containing text.

FIG. 10 is a diagram illustrating a group membership buffer and group count list generated in the text segmenter of FIG. 9 for the mixed mode image portion with the pixel image map of FIG. 8.

FIG. 13 is a diagram illustrating image maps of pixels, counts, and text classification for a portion of a mixed mode image containing text with an isolated textual mark (i.e., dot of an 'i').

DETAILED DESCRIPTION

In one embodiment described herein, techniques for text detection and segmentation are incorporated into an encoder/decoder ("codec") for mixed-mode images composed of mixed text and continuous-tone content. For an illustrative application involving compression of mixed-mode images, the codec is implemented in a screen capture tool, which provides means for a computer user to record an image or series of images displayed on his or her computer monitor. The screen capture image is sometimes called a screen image, screen shot, screen frame, capture image, etc. For example, the user might use the recorded screen image in a help manual, report, training video or other documents to show the results displayed on the computer monitor at a particular time. In alternative embodiments, the described text detection and segmentation techniques can be applied to other applications involving separation of text and continuous tone content in mixed mode images, such as desktop publishing, presentation, photograph and video editing, remote terminal access and like other software applications.

Figure 1A:
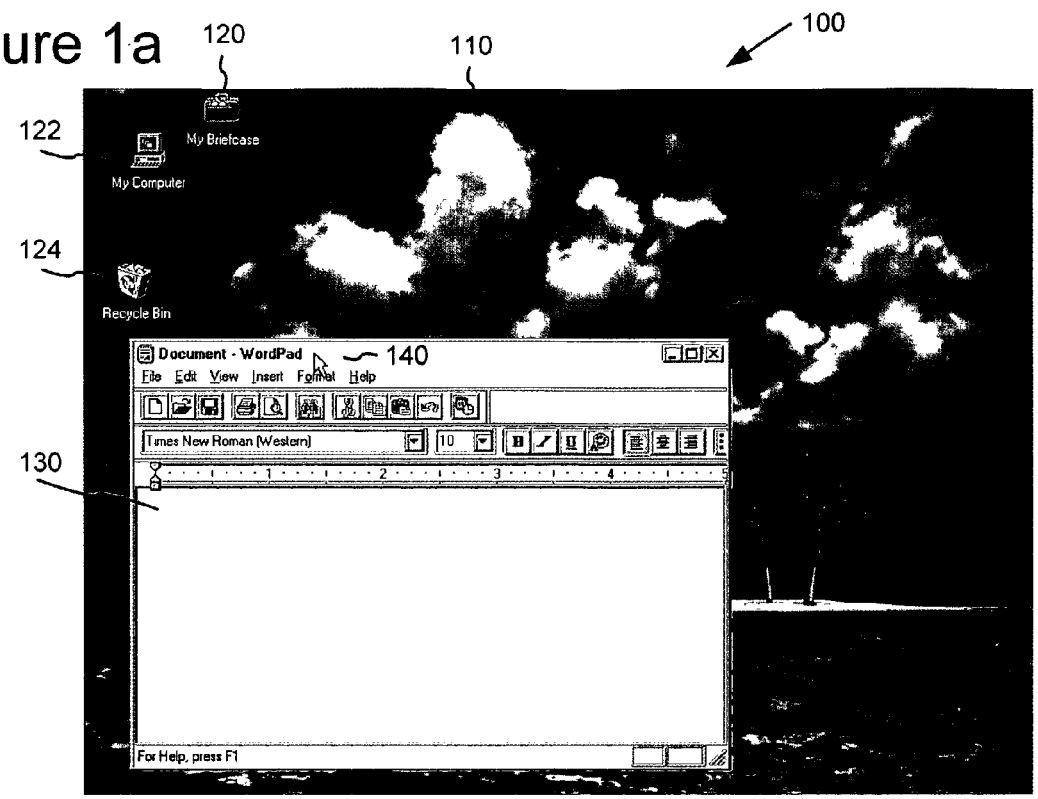
FIGS. 1a–1c illustrate screen images of a computer desktop environment that can be captured or recorded using a screen capture tool incorporating text detection and segmentation techniques.

FIG. 1a illustrates an example of a screen image (100) of a computer desktop environment that may be recorded using the screen capture tool. This exemplary screen image (100) depicts the entire desktop, but other examples of screen images that may be selected for recording using the screen capture tool can include only the window (130) or some other portion of the desktop. A cursor graphic (140) overlays the window (130), and several icon graphics (120, 122, 124) overlay a background (110). The background (110) of the illustrated screen image consists of a continuous-tone photographic image. The icons (120, 122, 124) include text labels that overlay the background image. In general, the desktop can include multiple windows, toolbars, menus, and other graphical interface features.

For some applications, a user records a series of screen images to show how screen content changes. The user might use the series of screen images within an instructional video for job training or remote instruction. Many companies that provide video-editing solutions also provide screen capture tools.

Figure 1B:
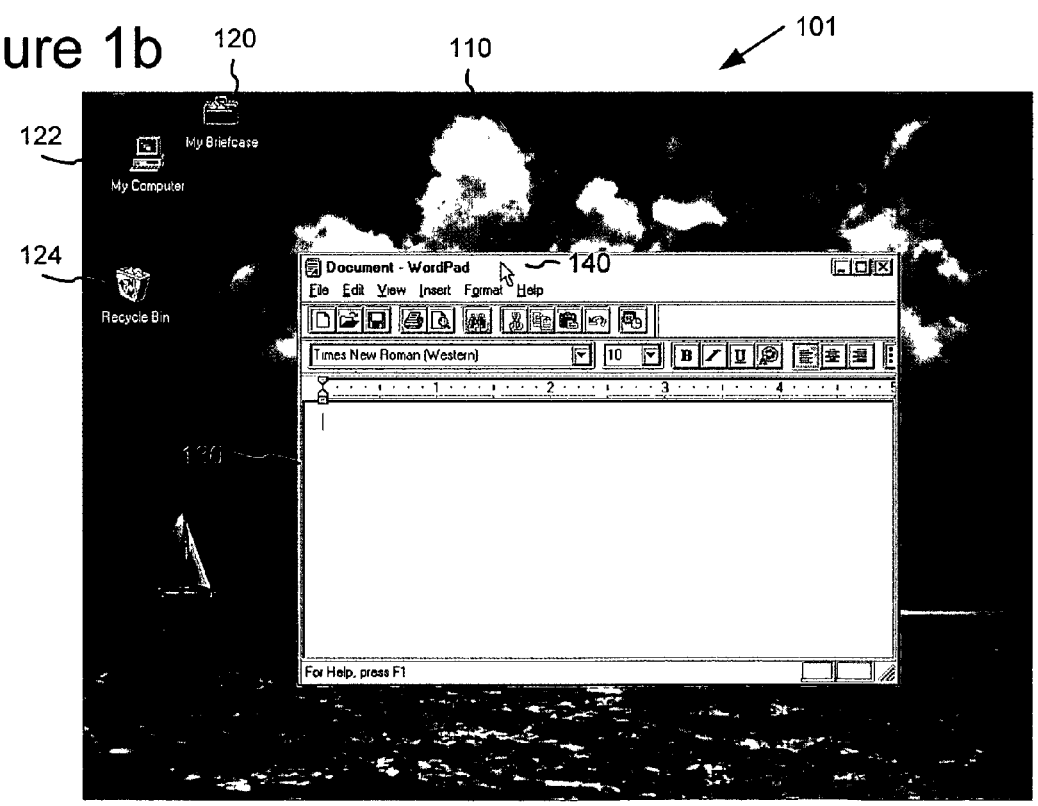
Figure 1C:
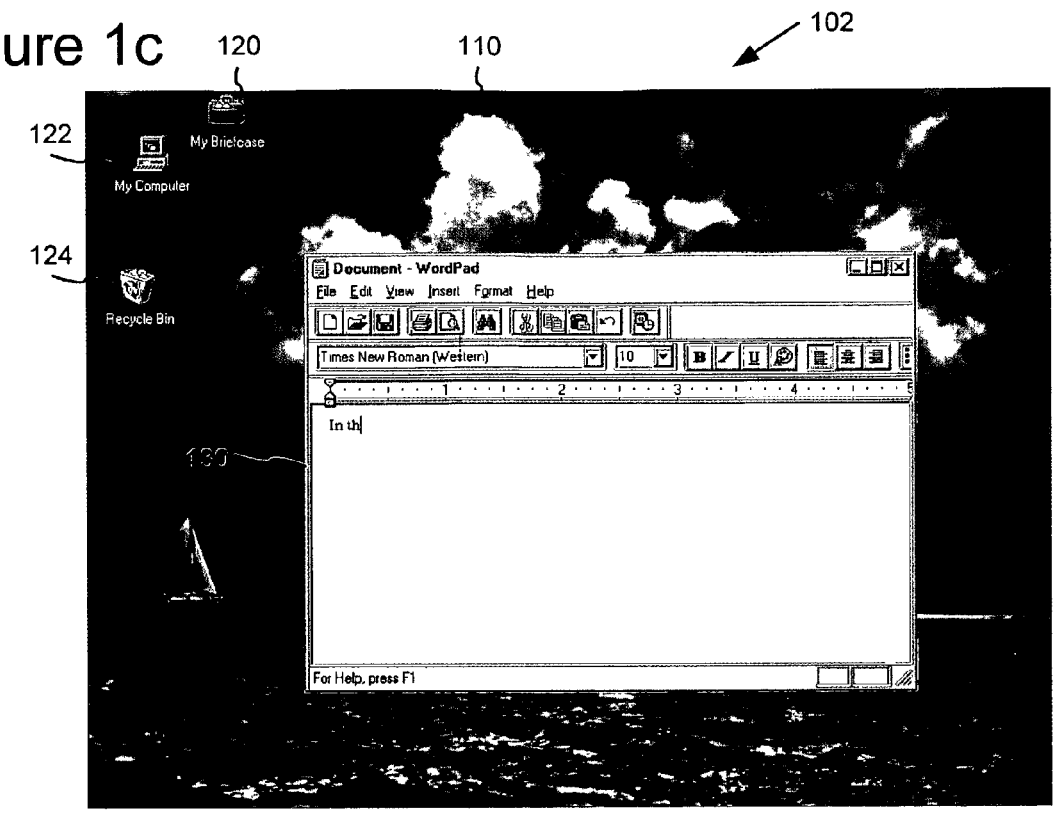

FIGS. 1b and 1c show screen images (101, 102) following the screen image (100) of FIG. 1a in a series. Much of the screen content shown in FIGS. 1a–1c is identical. Screen content such as the background (110) and icon graphics (120, 122, 124) usually does not change from frame to frame. On the other hand, the cursor graphic (140) often changes location and appearance as the user manipulates a mouse or other input device, and the contents of the window (130) often change as a user types, adds graphics, etc. FIG. 1b shows the cursor graphic (140) and the window (130) changing locations as the user drags the window (130) across the desktop, which in turn changes which portions of the background (110) are exposed. FIG. 1c shows the contents of the window (130) changing after typing by the user, while the cursor graphic (140) has disappeared.

When a series of screen images is captured in quick succession (for example, 15 frames per second) or when a window displays slowly changing content, changes in screen content from frame to frame tend to be small. On the other hand, when screen capture is less frequent (for example, 1 frame per second) or when a window displays quickly changing content such as a video game or motion picture, changes from frame to frame tend to be more pronounced. Dramatic changes in screen content can also occur, for example, when windows or menus are opened, closed, moved, resized, etc.

The quality of a series of screen images depends on several factors. Higher resolution and higher frame rate increase quality, but also increase performance costs. To understand how quality affects performance of a screen capture tool, it helps to understand how a computer represents and captures screen images.

Computer Representation of Screen Images

A single rectangular screen image includes rows of picture elements ["pixels"] with color values. The resolution of the screen image depends on the number of pixels and the color depth. The number of pixels of a rectangular screen image is usually expressed in terms of the dimensions of the rectangle, for example, 320×240 or 800×600. For images displayed at the same size, higher resolution gives a clearer picture. The color depth is usually expressed as a number of bits for a color value per pixel, which affects the number of possible colors for an individual pixel. Some conventional color depths are 1, 8, 16, and 24 bits. If the color depth is 8 bits, for example, there are $2^8=256$ possible colors per pixel. The 256 values can be shades of gray from white to black, or indices to a color palette that stores 256 different 24-bit colors in the screen image. A screen image represented by pixels and stored as a collection of bits, with each pixel having a color value, is an example of a bitmap.

The frame rate of a series of screen images (i.e., resolution in time) is usually expressed in terms of frames per second ["fps"]. Some conventional frame rates are 2, 10, 15, and 30 fps. For changing screen content, higher frame rate results in smoother playback of the content.

Quality affects the number of bits needed to represent a series of screen images, which in turn affects the cost of capturing, processing, storing, and transmitting the information. Table 1 shows the bit rates (bits per second) of several uncompressed series of screen images of different qualities.

TABLE 1

Bit rates of series of screen images of different quality.

| Spatial Resolution (pixels h × v) | Color Depth (bits) | Frame Rate (fps) | Bit Rate (bits per second) |
|---|---|---|---|
| 320 × 240 | 8 | 2 | 1,228,800 |
| 320 × 240 | 24 | 2 | 3,686,400 |
| 800 × 600 | 24 | 2 | 23,040,000 |
| 800 × 600 | 24 | 10 | 115,200,000 |

Display and Capture of Screen Images

Most computer systems include a display card, which stores information for output to a visual display unit (e.g., monitor). Common terms for display card include video card, graphics card, graphics output device, display adapter, video graphics adapter, etc.

In one common scenario, a computer system loads device driver software for a display card into system memory (usually some type of Random Access Memory ["RAM"]). The computer system accesses various features of the display card through device driver software.

On the display card, a frame buffer (which can be some type of RAM) stores pixel information from which the visual display unit is refreshed. In addition to the frame buffer, the display card can include a graphics processor, graphics accelerator or other hardware to make rendering more efficient.

A digital to analog converter converts the digital information in the frame buffer to an analog form, and the analog information is transmitted to the display unit. Conventionally, screen content is refreshed pixel-by-pixel across a row of the display unit, the rows are refreshed row-by-row from top to bottom, and the process repeats such that the entire display is refreshed 60 or more times per second. Many types of frame buffers are dual ported—while the system writes from system memory to a frame buffer, the display can read from the frame buffer to refresh current screen content.

In a screen capture operation, information is transferred from the display card frame buffer back to system memory of the computer system. Device drivers and/or other layers of software in the computer system often facilitate such transfer by supporting a Bit Block Transfer ["BitBlt"] operation, which a software application can utilize. In a BitBlt operation, a computer system transfers pixel information from a source (e.g., display card frame buffer) to a destination (e.g., system memory). In some implementations, the software application can specify the coordinates and dimensions of a rectangle in the screen or window for which information should be retrieved, up to the entire screen/window. Depending on implementation, the software application can specify other parameters as well, for example, source and destination.

An entire screen area rarely changes every frame. Instead, screen areas are fairly static, and there is no need to capture the entire screen area at every frame. Accordingly, the illustrated screen capture tool identifies changes in screen content that require transfers from a display card frame buffer to system memory. At the same time, the screen capture tool prioritizes transfers within system memory, for example, use of pixel information from a previously captured screen area for a current screen area.

The screen capture tool uses BitBlt operations to transfer pixel information from a display card frame buffer to system memory in a computer system with a display card. Alternatively, the screen capture tool uses another operation to retrieve the pixel information for a screen area and/or are operates in another environment. The screen capture tool is not limited to a particular operating system, computing platform, software tool, or hardware device.

Computing Environment

Figure 2:
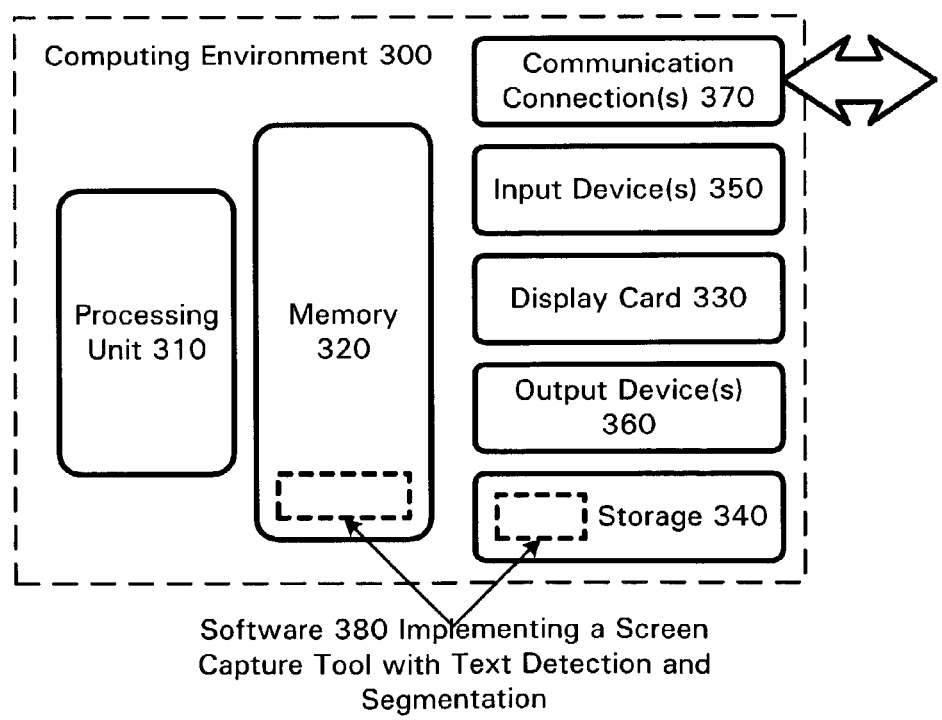
FIG. 2 is a block diagram of a suitable computing environment in which a screen capture tool incorporating text detection and segmentation techniques is implemented.

FIG. 2 illustrates a generalized example of a suitable computing environment (200) in which described embodiments may be implemented. The computing environment (200) is not intended to suggest any limitation as to scope of use or functionality of the invention, as the present invention may be implemented in diverse general-purpose or special-purpose computing environments.

With reference to FIG. 2, the computing environment (200) includes at least one processing unit (210) and memory (220). The processing unit (210) executes computer-executable instructions and may be a real or a virtual processor.

In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing a screen capture encoder and/or decoder with text detection and segmentation.

The computing environment (200) also includes a display card (230). The display card (230) (alternatively called the video card, graphics card, graphics output device, display adapter, video graphics adapter, etc.) delivers output to a visual display unit such as a computer monitor. The display card (230) includes a frame buffer that stores pixel information for display on a screen. The frame buffer is often some type of RAM on the display card (230), but can instead be some other kind of memory and/or not physically located on the display card itself. The display card (230) can include a graphics processor, graphics accelerator, and/or other specialized display hardware.

Typically, operating system software (not shown) provides an operating environment for other software executing in the computing environment (200), and coordinates activities of the components of the computing environment (200). In addition, display driver software allows access to various features of the display card (230). The display driver software can work in conjunction with one or more layers of operating system software through which access to the features of the display card (230) is exposed. For example, through such features, a screen capture tool might retrieve pixel information from the frame buffer of the display card (230) for screen content currently displayed on a screen of a visual display unit.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200).

The storage (240) may be removable or non-removable, and includes magnetic disks, magnetic tapes or cassettes, CD-ROMs, CD-RWs, DVDs, or any other medium which can be used to store information and which can be accessed within the computing environment (200). The storage (240) stores instructions for the software (280) implementing a screen capture encoder and/or decoder with text detection and segmentation.

The input device(s) (250) may be a touch input device such as a keyboard, mouse, pen, or trackball, a voice input device, a scanning device, sound card, TV tuner/video input card, or other device that provides input to the computing environment (200).

The output device(s) (260) may be a visual display unit, printer, speaker, CD-writer, or other device that provides output from the computing environment (200). A visual display unit presents screen content based upon output delivered from the display card (230).

The communication connection(s) (270) enable communication over a communication medium to another computing entity. The communication medium conveys information such as computer-executable instructions, compressed captured screen area information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various implementations. Computer-executable instructions for program modules may be executed within a local or distributed computing environment.

For the sake of presentation, the detailed description uses terms like "capture," "encode," and "decode" to describe computer operations in a computing environment. These terms are high-level abstractions for operations performed by a computer, and should not be confused with acts performed by a human being. The actual computer operations corresponding to these terms vary depending on implementation.

II. Screen Capture Tool

A screen capture tool captures screen content such as a desktop environment, application windows, a slideshow, and video, and (optionally) captures audio content as well. To reduce or even eliminate BitBlt usage when capturing a screen area, the screen capture tool uses pixel information already in system memory, for example, pixel information from a previously captured screen area. The screen capture tool then uses BitBit operations to get pixel information only for selected regions of the new screen area.

The screen capture tool can be a standalone software application, a feature of a multimedia production package (e.g., video editing software, audio/video production kit), a plug-in, or some other form of software and/or hardware product. The screen capture tool typically lets a user set high-level options for a capture session (e.g., media sources and types, quality, resultant bit rate, buffer size, and output stream or file location). The screen capture tool can also present low-level options to the user, such as frame rate, output resolution, time distortion (e.g., slow motion). The output of the screen capture tool can be saved to a file or streamed over a network.

The screen capture tool can include or be combined with a compression tool to reduce the bit rate of a series of captured screen areas. The compression tool can be a screen capture encoder (for lossless encoding) or a video encoder (for lossy, but lower bit rate encoding) selected from a group of available encoders.

In some cases, a captured screen area shows an entire screen, for example, an entire desktop environment. In other cases, the screen area shows a selected window or arbitrary region of the desktop environment. In general, a screen area depicts some or all of the screen content presented or prepared for presentation in a desktop environment or other graphical user interface for a computer system.

The frame rate for a series of captured screen areas may be fixed for the duration of the series, for example, according to a wizard-defined setting, user-specified setting, or the capabilities of the computing environment. Or, the frame rate may vary during screen capture for all or part of a screen area so as to increase temporal resolution when possible and decrease temporal resolution (even dropping frames) if necessary.

Exemplary Screen Capture Encoder and Decoder

Figure 3:
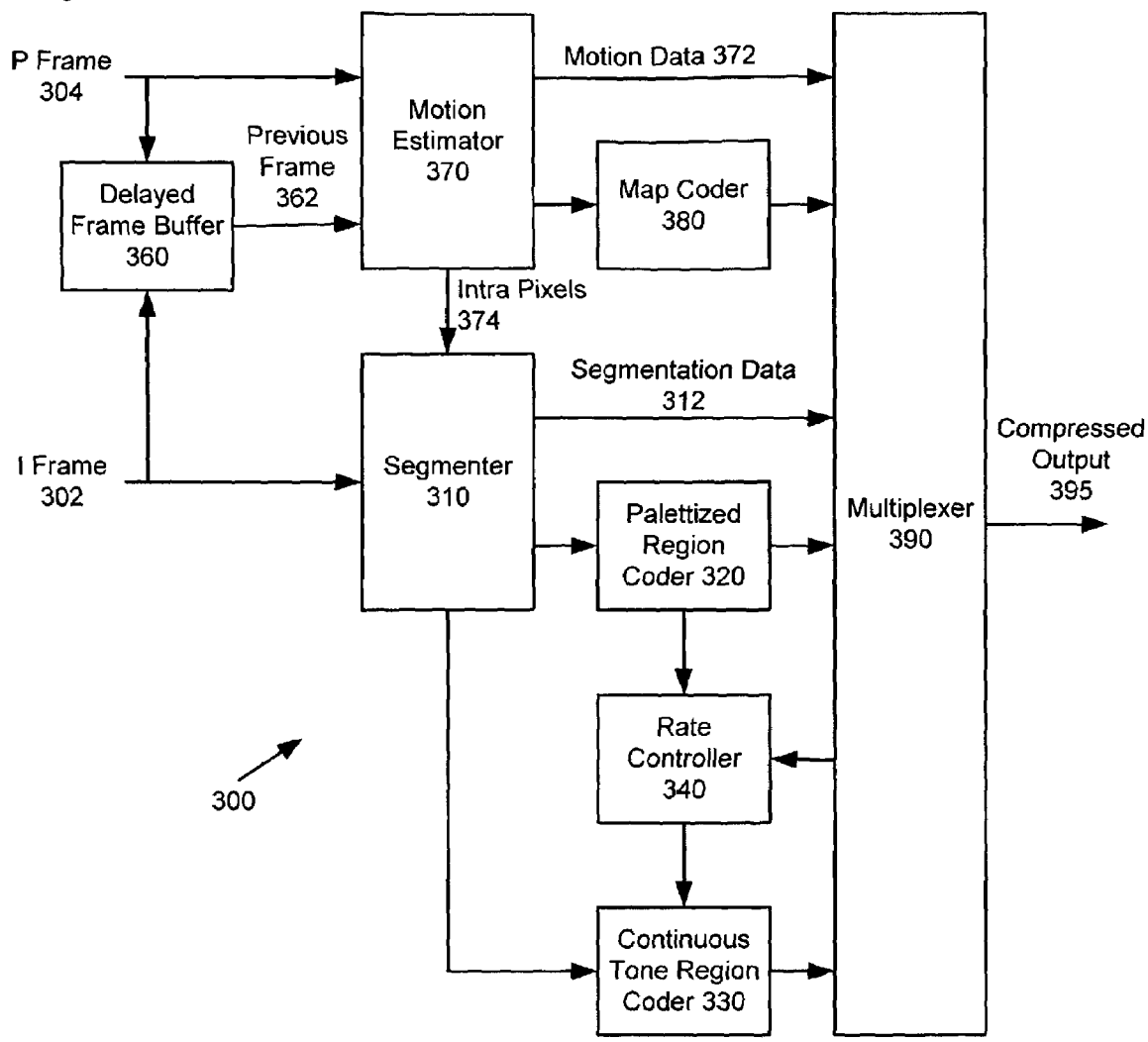
FIGS. 3 and 4 are block diagrams of a screen capture encoder and decoder implemented in the screen capture tool of FIG. 2.
Figure 4:
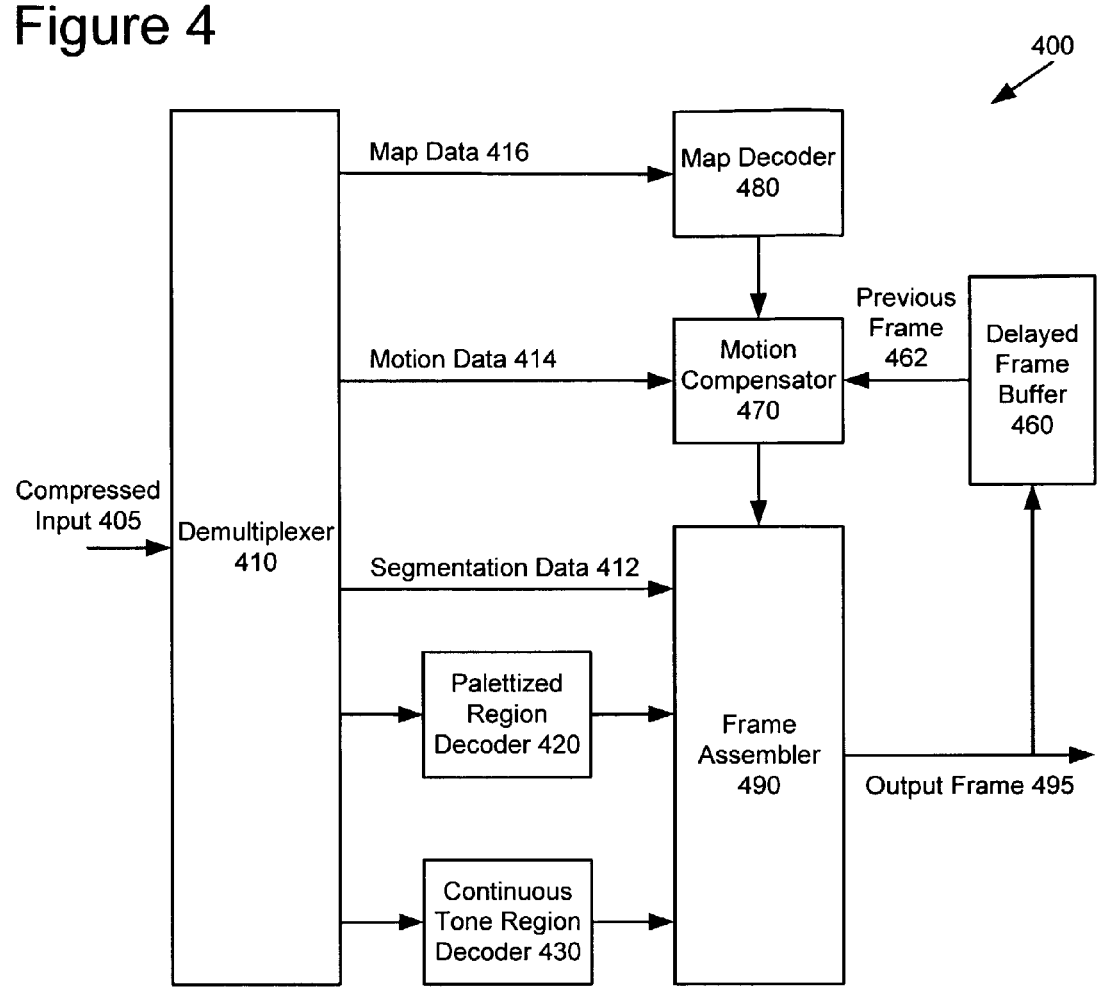

FIGS. 3 and 4 are block diagrams of an exemplary screen capture encoder (300) and an exemplary screen capture decoder (400), respectively. In various respects, the encoder (300) and decoder (400) are customized to compress/decompress frames of pixel information for screen areas captured from the screen of a visual display unit. Alternatively, the encoder (300) and decoder (400) compress/decompress frames of pixel information for other types of content.

In a common screen capture scenario, a screen capture module (not shown) captures screen areas that the encoder (300) compresses as a series of frames. The screen capture module can be a standalone software application, a feature of a multimedia production or encoding package, a plug-in, or some other form of product. The captured screen areas can show an entire screen (for example, an entire desktop environment), a selected window, or an arbitrary region of the desktop environment. In general, a screen area depicts some or all of the screen content presented or prepared for presentation in a desktop environment or other graphical user interface for a computer system. To capture a screen area, the screen capture module uses a Bit Block Transfer or other screen capture technique, such as one described in U.S. patent application Ser. No. 10/160,697, filed May 30, 2002, entitled "Reducing Information Transfer In Screen Capture Series," hereby incorporated by reference.

The screen capture module typically lets a user set high-level options for a capture session (e.g., media sources and types, quality, resultant bit rate, and output stream or file location). The screen capture module can also present low-level options to the user, such as capture frame rate, output resolution, time distortion (e.g., slow motion). The capture frame rate for a series of screen areas may be fixed for the duration of the series or vary during screen capture for all or part of a screen area so as to increase temporal resolution when possible and decrease temporal resolution (even skipping frames) if necessary.

The relationships shown in FIGS. 3 and 4 indicate the main flow of information in the encoder and decoder; other relationships are not shown for the sake of simplicity. Depending on implementation and the type of compression/decompression desired, modules of the encoder or decoder can be added, omitted, split into multiple modules, combined with other modules, and/or replaced with like modules. In alternative embodiments (some of which are described below), an encoder or decoder can include different modules and/or other configurations of modules for text detection and segmentation.

Exemplary Screen Capture Encoder

The exemplary screen capture encoder (300) includes a segmenter (310), a palettized region coder (320), a continuous tone region coder (330), a rate controller (340), a delayed frame buffer (360), a motion estimator (370), a map coder (380), and a multiplexer (390). With these modules, the encoder (300) performs live or off-line compression of a series of frames. The encoder (300) multiplexes the output of the various modules to produce a bitstream of compressed output (395) in system memory, a file in storage, one or more streams over a network, or another location. The input and output formats of the encoder (300) vary by implementation.

The encoder (300) compresses the first frame of the series as an I Frame (302) (alternatively called a key frame, intra frame, or intra-coded frame), using only information within the I Frame (302) to compress the I Frame (302). The encoder (300) compresses each of one or more subsequent frames of the series as a P Frame (304) (alternatively called a predicted frame, inter frame, or inter-coded frame). Each P Frame (304) may be compressed with reference to one or more other frames (for example, the previous frame). Also, the encoder (300) can compress a subsequent frame as an I Frame (304) periodically, as necessary (e.g., when the frame changes dramatically relative to the previous frame), or on some other basis.

For compression of an I Frame (302), the encoder (300) provides the I Frame (302) to the segmenter (310). The segmenter (310) partitions the I Frame (304) into continuous tone regions and palettized regions. The continuous tone regions are characterized by a large color space (e.g., 24 bits per pixel) and gradually varying color values from pixel to pixel. In a captured screen area, the continuous tone regions might include a background wallpaper photograph or an image in a web browser. On the other hand, the palettized regions are characterized by a smaller color space (e.g., 8 bits per pixel, often indices to a color palette), long runs of identical color values, and sharply contrasting changes in color value when changes occur. In a captured screen area, the palettized regions might include text on a solid background, icons, buttons, toolbars, menus, or other user interface features. The segmenter (310) may also segment graphical text from continuous tone regions, so that the text can be compressed losslessly, even if the encoder (310) introduces distortion in the continuous tone regions to reduce bit rate. Alternatively, the segmenter (310) uses other segmentation techniques and/or segments regions according to different or additional criteria.

The segmenter (310) transmits segmentation data (312) to the multiplexer (390) describing the segmented regions. The segmentation data (312) can be compressed in a lossy or lossless manner. The segmenter (310) also transmits pixel information for the regions of the I Frame (302) to the palettized region coder (320) and the continuous tone region coder (330).

The palettized region coder (320) compresses the palettized regions using techniques adapted to the characteristics of palettized screen content. Lossy compression techniques introduce distortion that can obliterate fine detail such as text and button graphics in palettized regions. Accordingly, the palettized region coder (320) uses a lossless compression technique such as run length coding, arithmetic coding, dictionary coding, variable-to-variable length coding, Huffman coding, LZ coding, a combination of the above, or some other entropy coding technique. Alternatively, the palettized region coder (320) uses compression techniques different than or in addition to the foregoing techniques to compress the palettized regions.

The palettized region coder (320) transmits data such as the pixel information and side information for the palettized regions to the multiplexer (390).

The continuous tone region coder (330) compresses the continuous tone regions using techniques adapted to the characteristics of continuous tone screen content. The continuous tone region coder (330) uses a combination of lossy and lossless compression techniques. Ideally, the continuous tone region coder (330) uses lossless compression or introduces imperceptible distortion, but the bit rate for such compressed output is often too high. In many scenarios, output must be compressed to a lower bit rate, or available bits are better spent on higher frame rate to smooth changes in palettized regions from frame to frame. To reduce bit rate for the continuous tone regions at some cost to quality, the continuous tone region coder (330) uses some form of quantization (e.g., scalar or vector, uniform or non-uniform, and static or adaptive). Quantization introduces irreversible loss of information, but can also allow the encoder (300) to regulate quality and bitrate. The quantization potentially follows a frequency transformation or decomposition (e.g., DCT, FFT, MLT, wavelets, subband coding) of the pixel information for the continuous tone regions, and can incorporate perceptual modeling. After the quantization, the continuous tone region coder (330) uses some form of lossless compression such as run length coding, arithmetic coding, dictionary coding, variable-to-variable length coding, Huffman coding, LZ coding, a combination of the above, or some other entropy coding technique. Alternatively, the continuous tone region coder (330) uses compression techniques different than or in addition to the foregoing techniques to compress the continuous tone regions.

The continuous tone region coder (330) transmits data such as pixel information and side information for the continuous tone regions to the multiplexer (390).

The rate controller (340) regulates the overall bit rate of the compressed output (395) by controlling the quantization of the continuous tone regions in the continuous tone region coder (330). The rate controller (340) receives information from other modules of the encoder (300), including the bit rate of the palettized regions for the frame and the current fullness of a virtual buffer in the multiplexer (390). Using this information and other information for the encoding session (e.g., average bits per pixel for I Frame or P Frame, quality criteria), the rate controller (340) budgets bits for the continuous tone regions and transmits the bit budget to the continuous tone region coder (330). The rate controller (340) seeks to satisfy numerous bit rate and quality constraints, both instantaneous and long term. For example, the rate controller (340) seeks to avoid virtual buffer underflow and overflow, maintain relatively constant bit rate over time, allocate bits for continuous tone regions fairly from frame to frame, and maintain at least a minimum quality for continuous tone regions. The continuous tone region coder (330) tests one or more quantization levels, and the results are evaluated in terms of bit rate and quality. When the quality of the continuous tone regions falls below a certain point, the encoder (300) may drop a frame or the continuous tone regions rather than send poor quality information. Alternatively, the rate controller (340) uses techniques different than or in addition to the foregoing techniques to control the rate and/or quality of some or all types of pixel information.

The multiplexer (390) multiplexes the information received from the various modules of the encoder (300), producing output (395) in a format that the decoder (400) recognizes. The multiplexer (390) may also receive other information not shown in FIG. 3, such as frame header information, from the various modules of the encoder (300) or elsewhere. The multiplexer (390) includes a virtual buffer, which stores a pre-determined duration of compressed information (e.g., 5 seconds) in order to smooth over short-term fluctuations in bit rate due to complexity changes or other characteristics of the content or encoder (300). The virtual buffer outputs data at a constant or relatively constant bitrate (e.g., to a file or stream). The current fullness of the virtual buffer, the rate of change of fullness of the buffer, and other characteristics of the buffer can be used by the rate controller (340).

For compression of a P Frame (304), the encoder (300) provides the P Frame (304) to the motion estimator (370). The motion estimator (370) compares the P Frame (304) to the previous frame (362) buffered in the delayed frame buffer (360), which can be an I Frame or P Frame. In a pixel-by-pixel map for the P Frame (304), the motion estimator (370) indicates which of the pixels of the P Frame (304) are identical in value to the pixels at the same locations in the previous frame (362).

For regions of non-identical pixels in the P Frame (304), the motion estimator (370) computes motion information (372) (e.g., motion vector(s)) describing motion relative to the previous frame (362). To compute the motion information (372) the motion estimator searches in the previous frame (362) for regions that match the regions of non-identical pixels in the P frame (304). One match criterion is the number of exactly matching pixels. In the map for the P Frame (304), the motion estimator (370) indicates which of the pixels of the P Frame (304) should be reconstructed by motion compensation using the motion information (372). The remaining pixels of the P Frame (304) are intra pixels— neither identical in value to pixels at the same locations in the previous frame (362) nor predicted by the motion estimation. Alternatively, the motion estimator (370) uses techniques different than or in addition to the foregoing techniques to predict values for P Frames from reference frames and indicate the results.

The motion estimator (370) transmits the pixel-by-pixel map to the map coder (380). The motion estimator (370) also transmits pixel information for the intra pixels (374) of the P Frame (304) to the segmenter (310).

The map coder (380) compresses the pixel-by-pixel map for the P Frame (304) using a lossless compression technique such as run length coding, arithmetic coding, dictionary coding, variable-to-variable length coding, Huffman coding, LZ coding, a combination of the above, or some other entropy coding technique. Alternatively, the map coder (380) uses compression techniques different than or in addition to the foregoing techniques to compress the pixel-by-pixel map. For example, in an alternative embodiment, the map coder also compresses the map using lossy compression. The map coder (380) transmits data such as the compressed map to the multiplexer (390).

The segmenter (310), the palettized region coder (320), the continuous tone region coder (330), and the rate controller (340) perform the operations described above to compress the intra pixels (374) of the P Frame (304).

Although the exemplary encoder (300) includes a motion estimator (370) and rate controller (340), in alternative encoder embodiments incorporating text detection and segmentation as described herein, these elements among others can be omitted.

Exemplary Screen Capture Decoder

The exemplary screen capture decoder (400) includes a demultiplexer (410), a palettized region decoder (420), a continuous tone region decoder (430), a frame assembler (440), a delayed frame buffer (460), a motion compensator (470), and a map decoder (480). With these modules, the decoder decompresses a series of frames for playback.

The demultiplexer (410) demultiplexes the compressed input (405), producing outputs for the various modules of the decoder (400).

For decompression of an I Frame, the palettized region decoder (420) decompresses the palettized regions of the frame, for example, reversing the compression performed in the palettized region coder (320). The palettized region decoder (420) transmits the decompressed information for the palettized regions to the frame assembler (490).

The continuous tone region decoder (430) decompresses the continuous tone regions of the frame, producing reconstructed versions. For example, the continuous tone region decoder (430) reverses lossless compression performed in the continuous tone region coder (330) and then reverses any quantization and frequency transform/ decomposition operations performed in the continuous tone region coder (330), typically performing the inverse of the operation. The continuous tone region decoder (420) transmits the decompressed information for the continuous tone regions to the frame assembler (490).

The frame assembler (490) receives the segmentation data (412) from the demultiplexer (410) as well as the decompressed information from the palettized region decoder (420) and the continuous tone region decoder (430). Using this information, the frame assembler (490) constructs the I Frame. For example, the frame assembler (490) uses the segmentation data (412) to determine where to place the decompressed pixel information for the palettized regions and continuous tone regions in the I Frame. The frame assembler (490) then outputs a frame (495) for playback. The delayed frame buffer (460) can store the output frame (495) for use as a reference frame for the following frame.

For decompression of a P Frame, the map decoder (480) decompresses the map data (416), for example, reversing the compression performed in the map coder (380). The map decoder (480) transmits data such as the decompressed map to the motion compensator (470).

The motion compensator (470) receives the motion data (414) from the demultiplexer (410) as well as the decompressed map from the map decoder (480). Using the decompressed map and the previous frame (462), the motion compensator (470) constructs the regions of pixels of the P Frame that are identical in value to the pixels at the same locations in the previous frame (462). Using the decompressed map, the motion data (414), and the previous frame (462), the motion compensator (470) constructs the motion-compensated regions of pixels of the P Frame. Alternatively, the motion compensator (470) uses techniques different than or in addition to the foregoing techniques to compensate for prediction in the encoder. The motion compensator (470) transmits the constructed regions of the P Frame to the frame assembler (490).

The palettized region decoder (420) and continuous tone region decoder (430) decompress pixel information for the intra pixels of the P Frame, using the techniques described above.

The frame assembler (490) receives the decompressed pixel information for the intra pixels, the segmentation data (412) from the demultiplexer (410), and the constructed regions from the motion compensator (470). Using this information, the frame assembler (490) constructs the P Frame. For example, the frame assembler (490) uses the segmentation data (412) to determine how to place the decompressed pixel information for the palettized regions and continuous tone regions of the intra pixels of the P Frame around the constructed regions from the motion compensator (470). The frame assembler (490) then outputs a frame (495) for playback, which can be stored in the delayed frame buffer (460) for use as a reference frame.

Although the exemplary decoder (400) includes a map decoder (480), motion compensator (470) and delayed frame buffer (460), alternative decoder embodiments incorporating text detection and segmentation as described herein need not include all these depicted elements of the exemplary decoder.

Mixed-mode Image Codec with Text Segmentation

Figure 5:
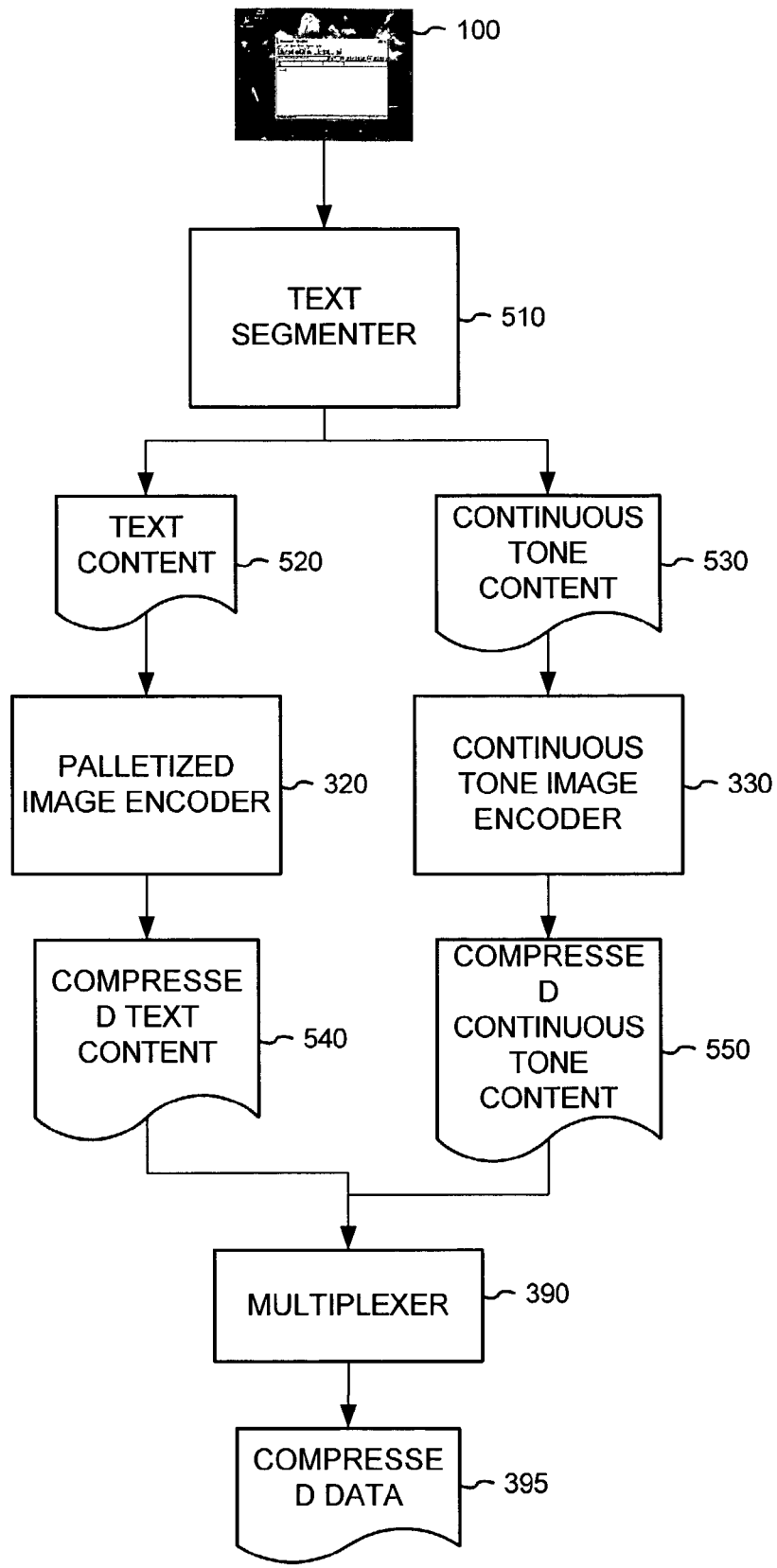
FIGS. 5 and 6 are a data flow diagram depicting a text segmentation operation for compression of a mixed-mode image with text and continuous tone content.

With reference now to FIG. 5, the exemplary screen capture encoder (300) of FIG. 3 also can include a text segmenter (510), which implements text detection and segmenting techniques described more fully below to separate text content (520) and continuous-tone content (530) in the mixed-mode screen capture image (100). The text segmenter (510) can be incorporated in the segmenter (310) (FIG. 3) of the encoder.

Once separated, the text content (520) can be separately compressed or encoded from the continuous-tone content (530). More particularly, the continuous-tone content is compressed by continous-tone image encoder (330), whereas the text content (520) is compressed by the palettized image encoder (320). As described above for the screen capture encoder (300), the compressed output of the palettized image encoder (320) and continuous tone image encoder (330) are combined by the multiplexer (390) to form the compressed data (395) output from the encoder (300). The separate compression of the text content (520) from the continuous tone content (530) allows the encoder to more effectively compress the continuous-tone content while preserving text quality and readability.

Figure 6:
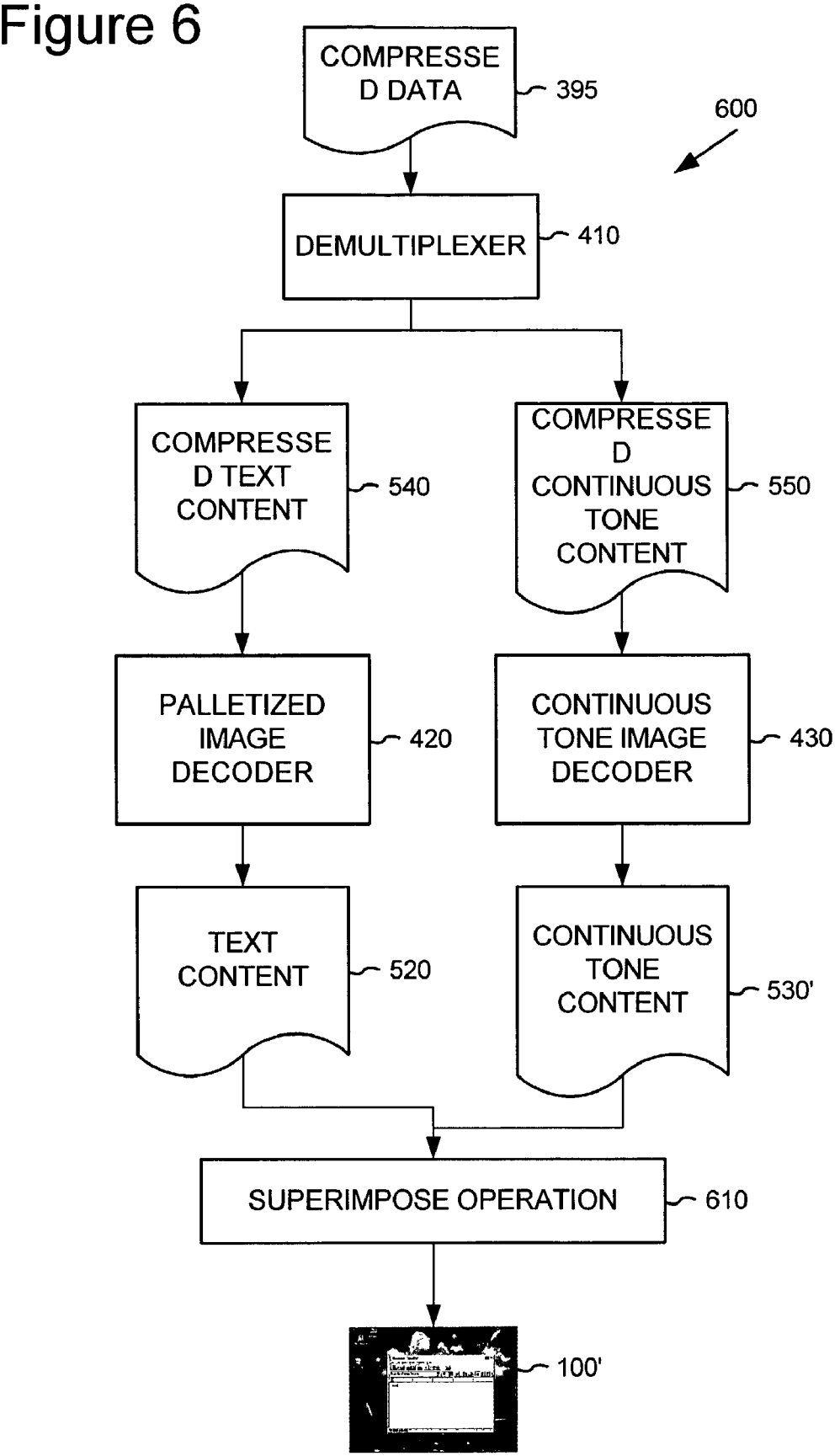

FIG. 6 depicts decompression in the screen capture decoder (400) (FIG. 4) of the compressed data (395) produced by the encoding using text segmentation in FIG. 5. The demultiplexer (410) separates the compressed text content (540) and the compressed continuous-tone content (550) in the compressed data (395) for input to the palettized image decoder (420) and continuous tone image decoder (430), respectively. The decoders (420, 430) separately decompress the text and continuous tone content to reconstruct the text content (520) and decoded continuous tone content (530'). After decompression, the text content (520) is superimposed on the continuous tone content (530') in a superimpose operation (610) to reproduce the screen capture image (100'). The decoded continuous tone content (530') and screen capture image (100') may differ slightly from the original screen capture image (100) due to the use of lossy image compression for the continuous tone encoder. However, where lossless compression is used for the palettized image encoder (320) on the text content (520), the text in the reproduced screen capture image (100') remains unchanged from its appearance in the original image (100).

Simple Text Segmentation Process

Figure 7:
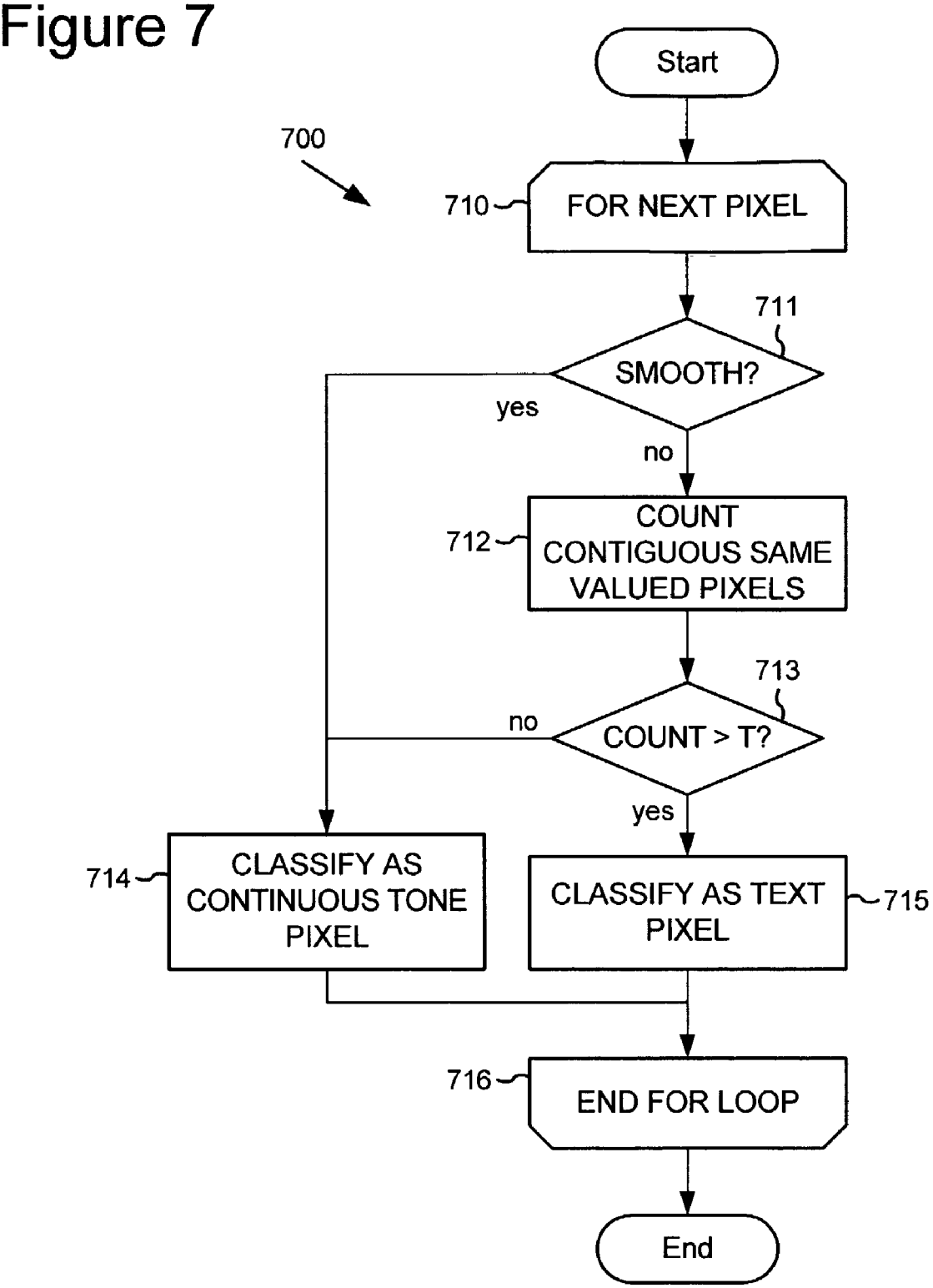
FIG. 7 is a flow chart for a process of detecting and segmenting text pixels within a mixed mode image.

With reference to FIG. 7, the text segmenter (510) (FIG. 5) performs a text detection and segmentation process (700) to separate text content (520) and continuous tone content (530) in the mixed-mode, screen capture image (100). As indicated at action (710), the text segmenter (510) processes pixels of the input image (e.g., the screen capture image (100) in FIG. 5) in a loop with actions 710–716. For example, the text segmenter (510) can process the image's pixels in left-to-right, top-to-bottom order, or some other processing order within the loop.

Within the loop, the text segmenter (510) performs various checks (711, 713) to distinguish whether the pixel currently being processed is text or continuous-tone content, and classifies (714, 715) the pixel accordingly. In text detection, the text segmenter (510) distinguishes text from continuous tone content based on a count of the number of pixels that are contiguous with and have a same value as the pixel being processed. Also, the text segmenter (510) relies on the property that the continuous tone content generally form a smooth gradient (e.g., in color or luminance), whereas text pixels generally are discontinuous (i.e., significantly different in value) with respect to the background continuous tone content.

Accordingly, the text segmenter (510) first determines (at action (711)) whether the pixel that is currently being processed forms a smooth gradient with its neighbors (e.g., a 3×3 block of pixels surrounding the current pixel). Such pixel is herein termed a "smooth pixel." In one embodiment, the test of whether a pixel is considered a smooth pixel is that the pixel's luminance value is within a certain smoothness threshold (which can be a maximum difference from the current pixel's value, or a percentage difference, or other type threshold) of all of its neighboring pixels' luminance values. Alternatively, the pixels' color value (e.g., RGB or other color model value) can be used instead of its luminance. When the current pixel meets the criteria for being smooth, the text segmenter (510) does not count the number of same-valued pixels contiguous with the current pixel, but rather directly classifies the pixel as continuous tone content at action (714). The threshold for smoothness is a parameter that can be varied in different embodiment of the text segmenter.

Figure 8:
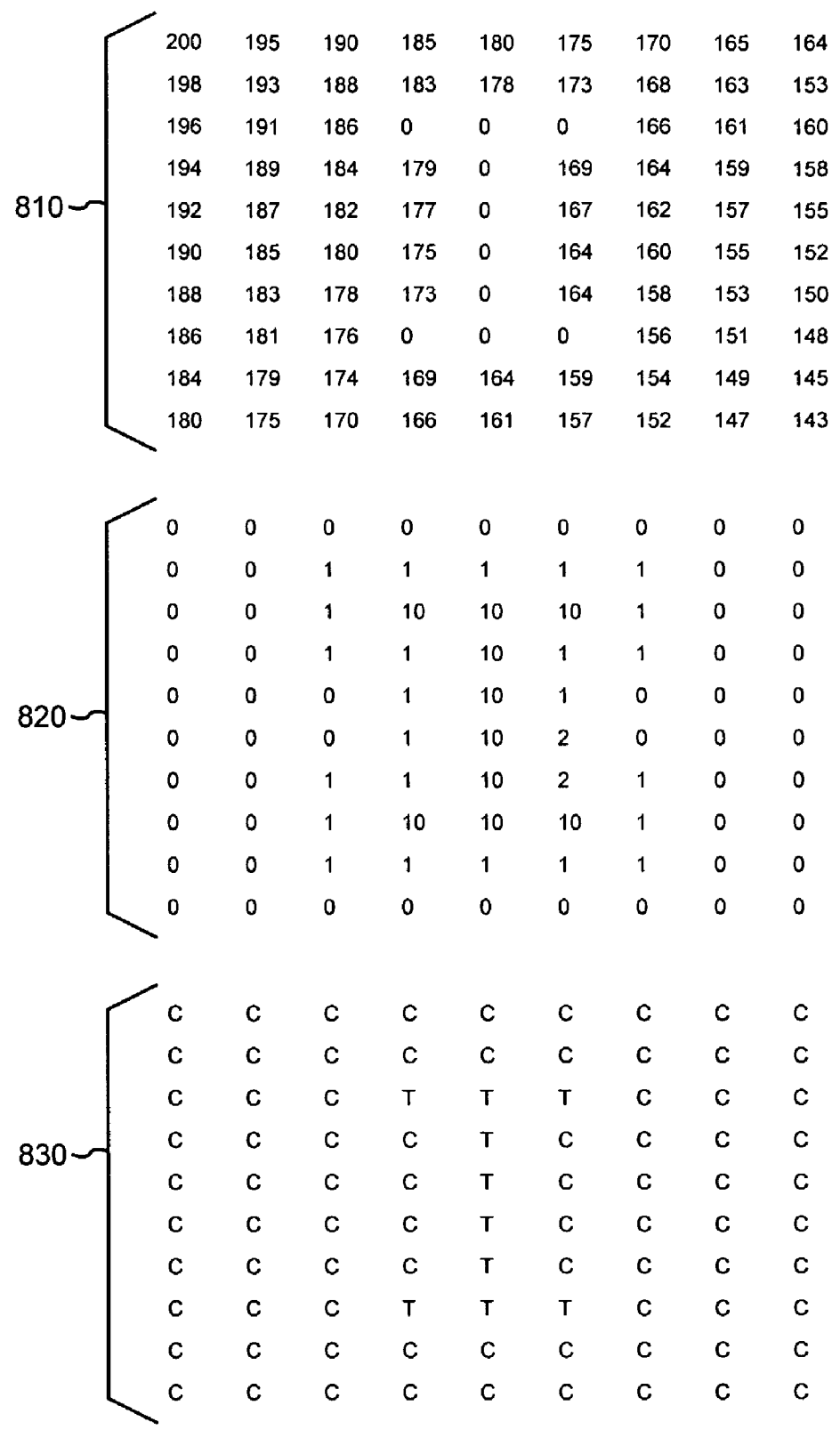

As an example, FIG. 8 illustrates an exemplary portion (810) of a mixed-mode image with a text character ("I") on a continuous tone background. The pixels forming the letter "I" have a same value ("0"), whereas the values of the continuous tone background pixels vary as a smooth gradient (between a value "200" at top left of the image portion, and a value "143" at bottom right). Those pixels in the exemplary mixed-mode image portion (810) that meet the test for smoothness are assigned a count of "0" in a count map (820), and classified as continuous-tone content ("C") in a classification map (830). For example, the pixel at row 2, column 2 of the exemplary mixed-mode image portion (810) (with value "193") is within a threshold (say, 20 in this example) of all its neighboring pixels within a 3×3 pixel neighborhood. The corresponding pixel locations in the count map (820) and the classification map (830) are assigned a "0" and "C," respectively, indicating that the pixel is classified as continuous-tone content.

As for those pixels not determined to be smooth (i.e., at least one neighboring pixel is significantly different in value), the text segmenter (510) next makes a count at action (712) of same-valued pixels that are contiguous with the current pixel. Generally, text generally is formed from strands of contiguous, same-valued pixels. Accordingly, pixels that correspond to text content generally will have a significant count of same-valued pixels contiguous thereto. In the exemplary mixed-mode image portion (810) for example, the pixels that border the text character "I" (e.g., the pixel with value "186" located at row 3, column 3) are determined to not be "smooth" at action (711), but only the pixel itself is a contiguous, same-valued pixel. So, these bordering pixels generally are assigned a count of "1" in the count map (820). By contrast, the ten pixels forming the text character "I" have the same value as and are contiguous with each other, and thus are assigned a count of "10" in the count map (820). At indicated at actions (713–715), those pixels (e.g., with value "0" in the exemplary mixed-image portion (810)) whose count of contiguous, same-valued pixels exceed a "strand size" threshold (say, 8 in this example) are classified as text content ("T" in classification map (830)). Otherwise, the non-smooth pixels whose count does not exceed the strand size threshold (e.g., pixels bordering the "I" in exemplary mixed-mode image map portion (810)) are still classified as continuous tone content ("C" in classification map (830)). The strand size threshold is a parameter that can be configured differently for different embodiments of the text segmentation process (700). The loop of the text segmentation process (700) then repeats for the next pixel of the mixed-mode image.

Text Segmenter

Figure 9:
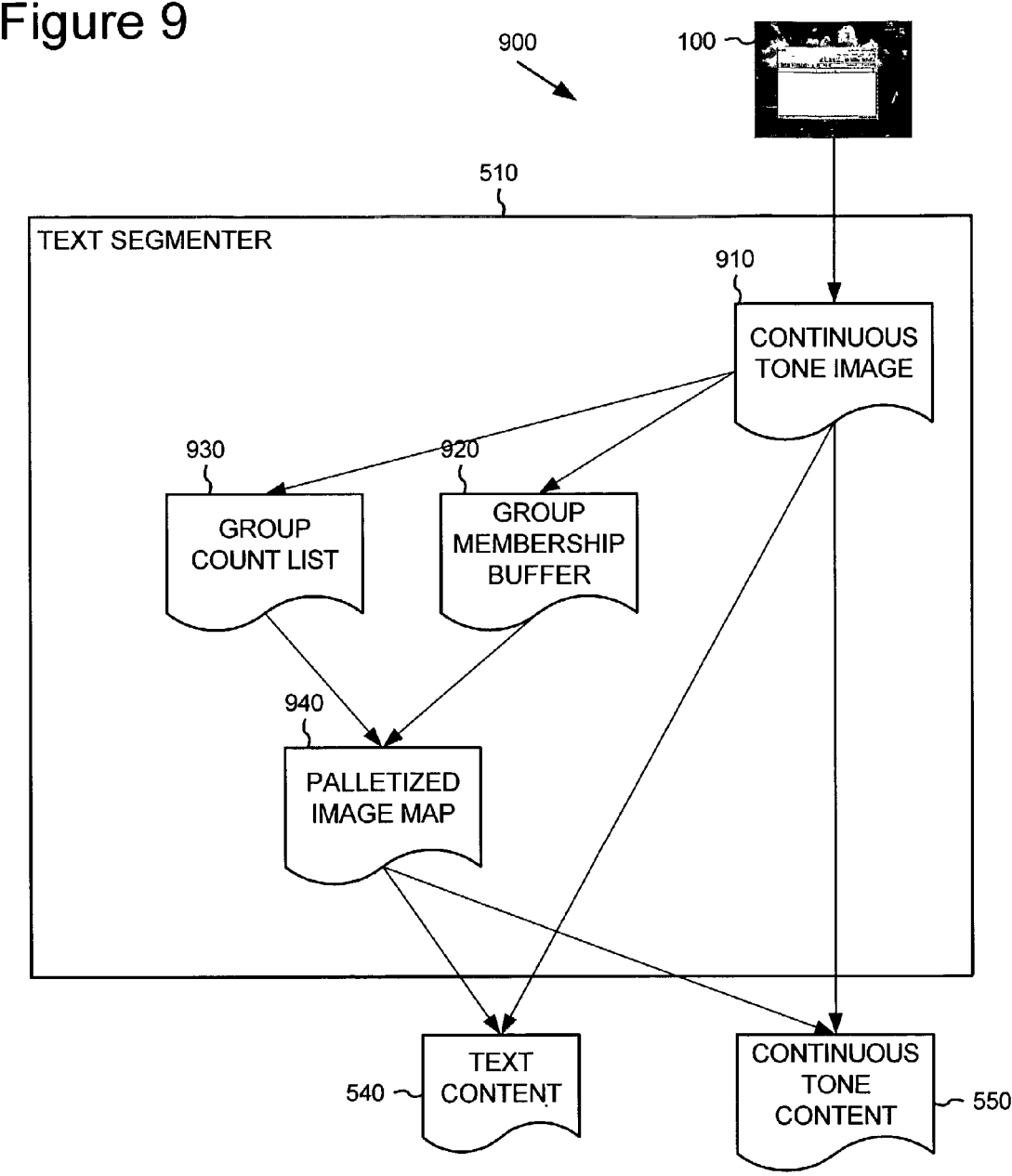
FIG. 9 is a data flow diagram depicting operation of a text segmenter within the text segmentation operation of FIG. 5.

In a text segmentation operation (900) shown in FIG. 9, the text segmenter (510) in one implementation thereof creates a group membership buffer (920) and a group count list (930) for use in making counts (e.g., for action (712) in the text segmentation process (700) in FIG. 7) of the pixels in same-value, contiguous pixel strands within the input mixed-mode, screen capture image (100). A continuous tone region of the mixed-mode screen capture image (100) is input to the text segmenter (510) as a continuous tone image (910), such as the exemplary mixed-mode image portion (810) in FIG. 8. The group membership buffer (920) can be an array with dimensions equal to the continuous tone image (910), and stores group indices into the group count list (930) at locations corresponding to pixels in the continuous tone image (910). The group count list (930) is a list of group index and count pairs that indicates the count of same-valued contiguous pixels in each group.

For example, FIG. 10 depicts examples of a group membership buffer (1020) and group count list (1030) for the exemplary mixed-mode image portion (810) in FIG. 8. The non-smooth pixels in the exemplary mixed-mode image portion (810) are assigned membership in groups identified by a group index stored in their corresponding location in the group membership buffer (1020). For example, the text pixels that form the text character "I" in the exemplary mixed-mode image portion (810) are all assigned membership to a group with group index "7," which is represented by storing the group index "7" in their corresponding locations in the group membership buffer (1020). A count of the number of pixels belonging in this group (i.e., ten) is stored associated with the group index "7" in the group count list (1030).

Based on the group count list (930) and group membership buffer (920), the text segmenter (510) can readily determine which groups of pixels to classify as text as per the criteria in the text segmentation process (700). The text segmenter (510) produces a palettized image map (940) in which the pixels classified as text are copied from the continuous tone image (910), whereas pixels classified as continuous-tone are set to an unused palette color value. The text segmenter (510) then outputs the palettized image map (940) as the text content (540).

On the other hand, the text segmenter (510) produces the continuous tone content (550) for output by copying pixels classified as non-text from the continuous tone image (910), and also setting pixels classified as text to equal an average of adjacent non-text pixel values. For example, the text pixel at column 4, row 3 of the exemplary mixed-mode image portion (810) would be set to an average (rounded to nearest integer) of its surrounding non-text pixel values (i.e., an average of 179, 184, 186, 188, 183 and 178). The replacement of text pixels with an average of their surrounding non-text pixels aids compression efficiency when subsequently encoding the continuous tone content (550). In alternative implementations, the text segmenter (510) can select the value of text pixels for the continues tone content (550) in other ways, such as setting equal to any one of its neighboring non-text pixel values, or even leaving the text pixel unaltered.

Text Segmentation Process

Figure 11:
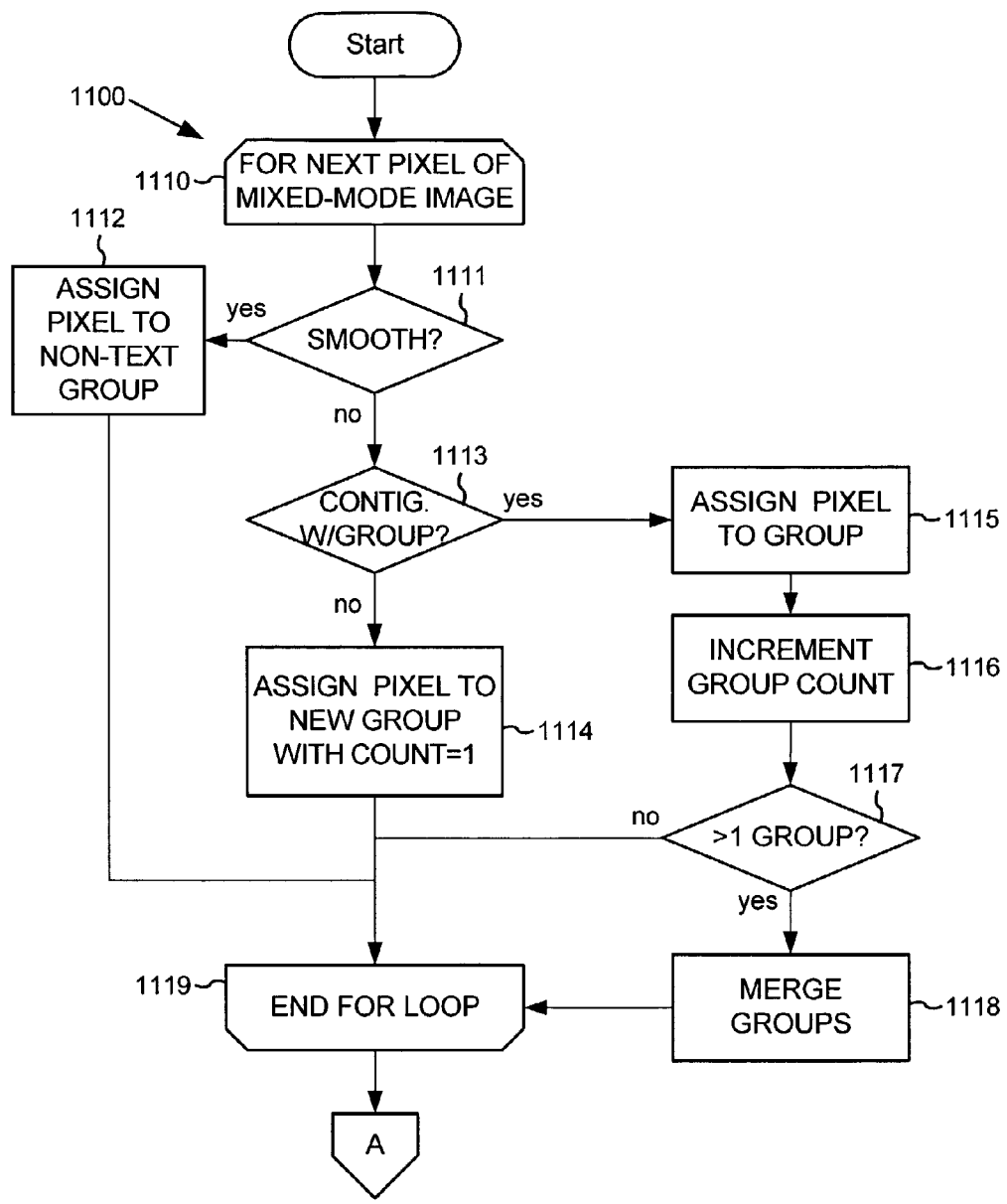
FIGS. 11 and 12 are a flow chart of a second process for text detection and segmentation that also accounts for long lines, borders, and isolated textual marks.
Figure 12:
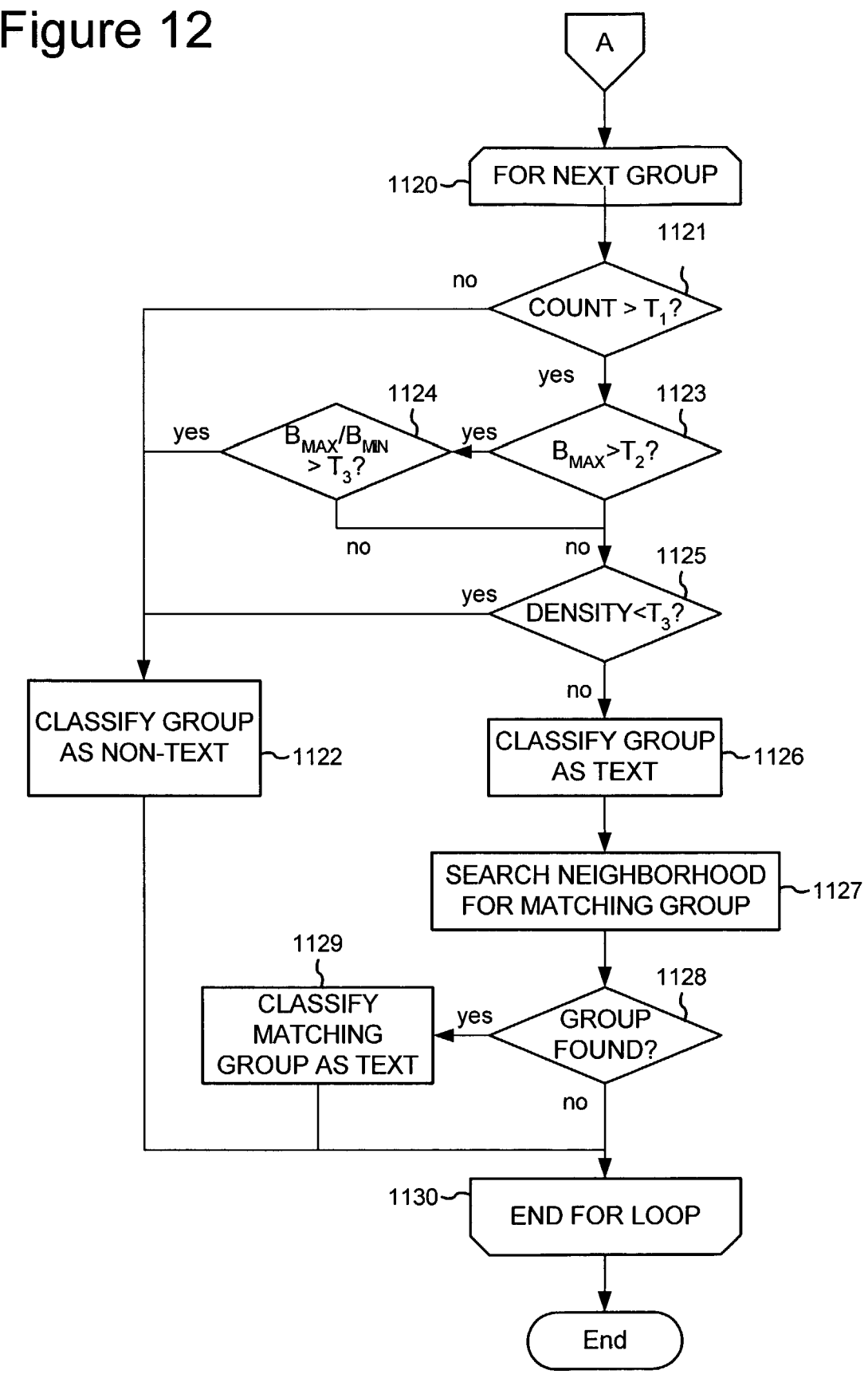

With reference now to FIGS. 11 and 12, a second text segmentation process (1100) is a variation on the simple text segmentation process (700) in FIG. 7 to account for certain situations in a mixed-mode image where the simple text segmentation process (700) can fail to properly classify pixels as text or continuous tone content. These situations include:

1. large square borders which the simple text segmentation process (700) may incorrectly classify as text;
2. large straight lines which the simple text segmentation process (700) may incorrectly classify as text; and
3. isolated pixels for text marks like dots on the letters "i" and "j" which the simple text segmentation process (700) may incorrectly classify as not being text.

In the second text segmentation process (1100), the text segmenter (510) also processes the pixels of the mixed-mode image within a loop of actions (1110–1119) to detect strands of contiguous, same-valued pixels. First, the text segmenter (510) determines whether the pixel currently being processed is a smooth pixel as described above for action (711) in the simple text segmentation process (700) of FIG. 7. If smooth, the text segmenter (510) assigns the pixel to a non-text group at action (1112), such as assigning to group '0' as depicted in the example group membership buffer (1020) in FIG. 10.

If not smooth, the text segmenter (510) determines whether the current pixel is contiguous with other pixels of the same value at action (1113). If the current pixel has the same value as a neighboring pixel that is already assigned in a group, the text segmenter (510) also assigns (at action 1114) the current pixel to that group in the group membership buffer (920) and increments (at action 1115) the pixel count for the group in the group count list (930). If not, the pixel is assigned a new group whose pixel count is set equal to one (at action 1114).

In some circumstances, the current pixel can be adjacent to more than one pixel of the same value that is assigned in different groups. This can occur, for example, with certain text characters, such as 'u,' 'v,' 'x,' or 'w,' which have separately diverging strokes or branches at their top. As pixels are processed in the text segmentation process (1100), a separate group may by started for the separate top branches of such text characters. When the text segmentation process (1100) eventually arrives at the pixel where the branches of the text character adjoin, then the current pixel would adjoin more than one same-valued pixel assigned in different groups. In this case, the text segmenter (510) detects that the two groups actually form one contiguous strand of same-valued pixels. At actions (1117) and (1118), the text segmenter (510) then merges or links the groups and aggregates the groups' counts. The loop of actions (1110–1119) then repeats for a next pixel of the image.

With reference now to FIG. 12, the second text segmentation process (1100) continues to perform a second loop with actions (1120–1130) to detect the situations (1–3) discussed above. In this second loop, the text segmenter (510) processes the groups of contiguous, same-valued pixels discovered in the first loop (actions 1110–1119). First, the text segmenter (510) at action (1121) determines whether the currently processed group's pixel count exceeds the strand size threshold for classification as text (as described above for action (713) in the simple text segmentation process (700)). If not, the text segmenter (510) classifies the group of pixels as continuous-tone content (not text) at action (1122).

For groups whose count exceeds the strand size threshold at action (1121), the text segmenter (510) performs further tests in actions (1123–1125) to detect the situations (1) and (2). The text segmenter (510) calculates the bounding dimensions for the current group (e.g., dimensions in pixels of a minimum-size bounding box fully enclosing the group). For example, the pixel group with group index 7 in the exemplary group membership buffer (1020) in FIG. 10 would have bounding dimensions (rows, columns) equal to (6, 3). At actions (1123 and 1124), the text segmenter (510) compares the larger of the group's bounding dimensions to a length threshold (designated $T_2$ in FIG. 12), and also compares a ratio of larger-to-smaller of the group's bounding dimensions to an elongation threshold (designated $T_3$ in FIG. 12). If both comparisons exceed the threshold, then the group is assumed to be a long straight line. So, the text segmenter (510) classifies the group to be continuous-tone content (not text) at action (1122). Otherwise, the text segmenter (510) further compares a pixel density for the group to a density threshold (designated $T_3$ in FIG. 12) at action (1125). The pixel density can be calculated as the group's pixel count divided by the bounding box area (for example, 10/(6*3) for the group with index 7 in the FIG. 10 example). If the pixel density is lower than the density threshold (which is characteristic of a strand forming a large border), the text segmenter (510) also classifies the group as continuous-tone content (not text). In one example implementation, suitable value for the thresholds include $T_1$=4, $T_2$=10, and $T_3$=0.05. These thresholds also are parameters that can vary depending on application and between implementations of the text segmentation process.

For groups that pass the tests (by not exceeding both the length and elongation thresholds, and not lower than density threshold) in actions (1123–1125), the text segmenter (510) classifies the group of pixels as text at action (1126). The text segmenter (510) then further conducts a search at action (1127) around a small neighborhood of the group (e.g., within a distance of 3 pixels) for other groups whose color matches that of the current group. If a group with a low pixel count (e.g., not meeting the strand size threshold requirement used in action 1121) is found that matches the current group's color at action (1128), then the text segmenter (510) also classifies such matching group (which is likely an isolated text mark) as text. The scope of the small neighborhood search also is a parameter that can vary by application and implementation of the text segmentation process.

Figure 13:
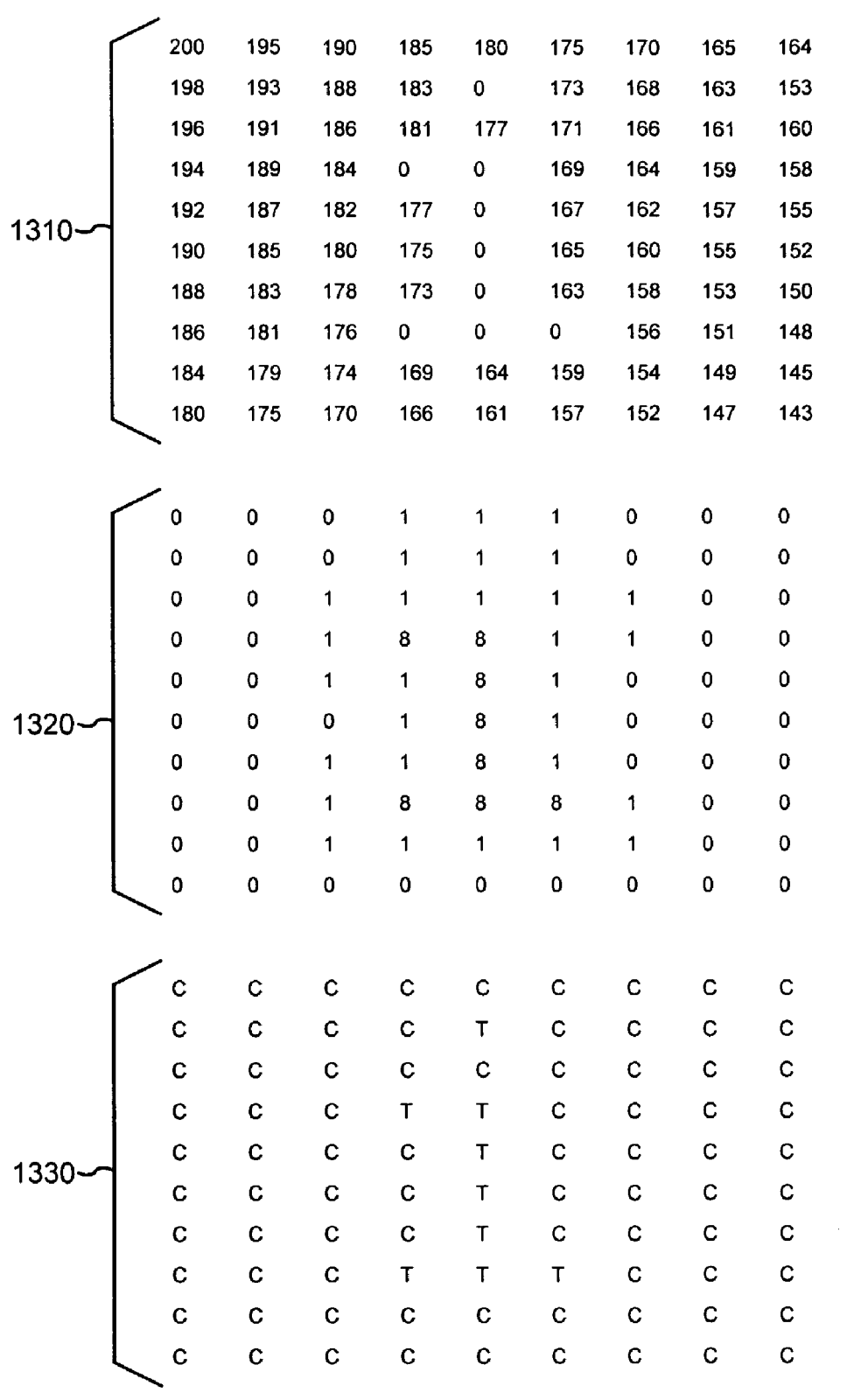

FIG. 13 illustrates an example of a mixed-mode image portion (1310) containing text with an isolated mark (the dot on the letter 'i'). In this example, the text segmentation process (1100) first determines that the pixels that form the stem of the letter 'i' form a group with a pixel count of 8 (as shown in the count map (1320)), which therefore is classified as text (as shown in the classification map (1330)). The text segmenter (510) then further searches in a small neighborhood of this group for other non-smooth pixel groups of the same color, and locates the group with a pixel count of 1 corresponding to the pixel at row 2, column 5 (which forms the dot on the letter 'i'). The text segmenter (510) also classifies the group forming the dot as text (as also shown in the classification map (1330)).

ALTERNATIVES

Having described and illustrated the principles of our invention with reference to illustrated embodiments, it will be recognized that the illustrated embodiments can be modified in arrangement and detail without departing from such principles. It should be understood that the programs, processes, or methods described herein need not be related or limited to any particular type of computer apparatus. Various types of general purpose or specialized computer apparatus may be used with, or perform operations in accordance with, the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

I claim:

1. A computer-implemented method of compressing a continuous tone region of an image containing text, the method comprising:
    separating contiguous strands of same-valued pixels corresponding to textual content within the continuous tone region;
    encoding the separated textual content pixels using a first compressor suited to palettized image compression; and
    encoding the continuous tone region using a second compressor suited to continuous-tone image compression;
    forming a compressed image data stream containing the encoded separated textual content pixels data and the encoded continuous tone region data.

2. The method of claim 1 further comprising:
    decoding the encoded continuous tone region data to reconstruct the continuous tone region image;

separately decoding the separated textual content pixels data to reconstruct the separated textual content pixels; and superimposing the separated textual content pixels onto the continuous tone region image.

3. The method of claim 1 wherein the separating comprises:

detecting strands of contiguous, same-valued pixels having a pixel count exceeding a size threshold; and classifying pixels that form the detected strands as textual content pixels.

4. The method of claim 3 wherein the separating further comprises:

detecting smooth pixels whose value forms a smooth gradient with respect to neighboring pixels; and classifying the detected smooth pixels as non-textual content pixels.

5. The method of claim 4 wherein the separating further comprises omitting the detected smooth pixels from the detecting strands of contiguous, same-valued pixels having a pixel count exceeding a size threshold.

6. The method of claim 1 wherein the separating comprises:

detecting strands of contiguous, same-valued pixels having a pixel count exceeding a size threshold;

determining whether a detected strand is a long, straight line or large border; and classifying pixels that form the detected strands that are not a long, straight line or large border as textual content pixels.

7. The method of claim 6 wherein the determining whether a detected strand is a long, straight line or large border further comprises:

determining bounding dimensions of the detected strand; and determining that the strand is a long, straight line if a larger of the bounding dimensions exceeds a length threshold and a ratio of the larger of the bounding dimensions to a smaller of the bounding dimensions exceeds an elongation threshold.

8. The method of claim 6 wherein the determining whether a detected strand is a long, straight line or large border further comprises determining that the strand is a large border if a pixel density for the strand is less than a density threshold.

9. The method of claim 6 wherein the separating further comprises:

detecting pixels having a same value as and near the detected strands that are not a long, straight line or large border; and classifying said detected same-valued, nearby pixels as textual content pixels.

10. A computer-implemented method of compressing a continuous tone region of an image containing text, the method comprising:

on a pixel-by-pixel basis, classifying pixels of the region as being continuous tone or text;

forming a palettized image region corresponding to the continuous tone region wherein pixels classified as being continuous tone are assigned a background color value;

compressively encoding the palettized image region using a first compression process suited to palettized image compression; and compressively encoding the continuous tone region using a second compression process suited to continuous tone image compression.

11. The method of claim 10 wherein said classifying comprises:

for a pixel in the continuous tone region, checking whether its neighboring pixel's values are within a smoothness threshold of the pixel's value; and if so, classifying the pixel as continuous tone.

12. The method of claim 10 wherein said classifying comprises:

for a pixel in the continuous tone region, generating a count of a number of same-valued pixels contiguous with the pixel; and if the count exceeds a strand size threshold, classifying the pixel as text.

13. The method of claim 12 wherein said classifying further comprises:

for a strand of pixels classified as text, detecting any nearby same-valued pixels in the continuous tone region; and classifying the nearby same-valued pixels as text.

14. The method of claim 10 wherein said classifying comprises:

for a pixel in the continuous tone region, generating a count of a number of same-valued pixels contiguous with the pixel; and if the count exceeds a strand size threshold, further detecting whether the same-valued, contiguous pixels form a long, elongated strand; and if the count exceeds the strand size threshold, classifying the pixel as text unless the same-valued, contiguous pixels are detected to form a long, elongated strand.

15. The method of claim 10 wherein said classifying comprises:

for a pixel in the continuous tone region, generating a count of a number of same-valued pixels contiguous with the pixel; and if the count exceeds a strand size threshold, further generating a pixel density of the same-valued, contiguous pixels within a minimal bounding box about the same-valued, contiguous pixels; and if the count exceeds the strand size threshold, classifying the pixel as text unless the pixel density is less than a sparseness threshold.

16. A computer-implemented method of detecting pixels of textual content in a continuous tone region of an image, the method comprising:

identifying pixels in the continuous tone region that are non-smooth relative to the values of their neighboring pixels;

identifying contiguous groups of the non-smooth pixels that have a same-value; and determining whether pixel counts of the identified contiguous groups exceed a size threshold; and classifying pixels that form an identified contiguous group whose pixel count exceeds the size threshold as textual content.

17. The method of claim 16 further comprising:

determining whether the identified contiguous groups have long, elongated bounding dimensions; and except, classifying pixels that form another identified contiguous group whose pixel count exceeds the size threshold but has long, elongated bounding dimensions as not textual content.

18. The method of claim 16 further comprising:

determining whether pixel densities of the identified contiguous groups are sparse; and except, classifying pixels that form another identified contiguous group whose pixel count exceeds the size threshold but whose pixel density is sparse as not textual content.

19. The method of claim 16 further comprising:
identifying non-smooth pixels in a vicinity of the identified contiguous group and that have a same value as the identified contiguous group; and
also classifying the identified, same-valued non-smooth pixels in the identified contiguous group's vicinity as textual content.

20. A computer-readable medium having computer-executable instructions stored thereon for performing a method of separating pixels of textual content in a continuous tone region of an image, the method comprising:
separating pixels corresponding to textual content within the continuous tone region;
encoding the separated textual content pixels using a first compressor suited to palettized image compression; and
encoding the continuous tone region using a second compressor suited to continuous-tone image compression;
forming a compressed image data stream containing the encoded separated textual content pixels data and the encoded continuous tone region data.

21. The computer-readable medium of claim 20 wherein the method further comprises:
decoding the encoded continuous tone region data to reconstruct the continuous tone region image;
separately decoding the separated textual content pixels data to reconstruct the separated textual content pixels; and
superimposing the separated textual content pixels onto the continuous tone region image.

22. The computer-readable medium of claim 20 wherein the method further comprises:
detecting strands of contiguous, same-valued pixels having a pixel count exceeding a size threshold; and
classifying pixels that form the detected strands as textual content pixels.

23. The computer-readable medium of claim 22 wherein the method further comprises:
detecting smooth pixels whose value forms a smooth gradient with respect to neighboring pixels; and
classifying the detected smooth pixels as non-textual content pixels.

24. The computer-readable medium of claim 23 wherein the separating further comprises omitting the detected smooth pixels from the detecting strands of contiguous, same-valued pixels having a pixel count exceeding a size threshold.

25. The computer-readable medium of claim 20 wherein the method further comprises:
detecting strands of contiguous, same-valued pixels having a pixel count exceeding a size threshold;
determining whether a detected strand is a long, straight line or large border; and
classifying pixels that form the detected strands that are not a long, straight line or large border as textual content pixels.

26. The computer-readable medium of claim 25 wherein the determining whether a detected strand is a long, straight line or large border further comprises:
determining bounding dimensions of the detected strand; and
determining that the strand is a long, straight line if a larger of the bounding dimensions exceeds a length threshold and a ratio of the larger of the bounding dimensions to a smaller of the bounding dimensions exceeds an elongation threshold.

27. The computer-readable medium of claim 25 wherein the determining whether a detected strand is a long, straight line or large border further comprises determining that the strand is a large border if a pixel density for the strand is less than a density threshold.

28. The computer-readable medium of claim 25 wherein the separating further comprises:
detecting pixels having a same value as and near the detected strands that are not a long, straight line or large border; and
classifying said detected same-valued, nearby pixels as textual content pixels.

29. A computer system comprising:
a text segmenter operating to process pixels in a continuous tone region of an image to detect contiguous strands of same-valued pixels forming text, and to generate a separate image map containing the detected text pixels;
a palettized image encoder operating to compressively encode the separate image map of detected text pixels using a palettized image compression process; and
a continuous tone image encoder operating to compressively encode the continuous tone region using a continuous tone image compression process; and
a multiplexer operating to combine the encoded separate image map and continuous tone region into a compressed output data.

30. The computer system of claim 29 wherein the text segmenter operates to detect the text pixels by, for a pixel in the continuous tone region, checking whether its neighboring pixel's values are within a smoothness threshold of the pixel's value, and if so, classifying the pixel as not text.

31. The computer system of claim 29 wherein the text segmenter operates to detect the text pixels by, for a pixel in the continuous tone region, generating a count of a number of same-valued pixels contiguous with the pixel, and if the count exceeds a strand size threshold, classifying the pixel as text.

32. The computer system of claim 31 wherein the text segmenter further operates to, for a strand of pixels classified as text, detect any nearby same-valued pixels in the continuous tone region, and also classify the nearby same-valued pixels as text.

33. The computer system of claim 29 wherein the text segmenter operates to detect the text pixels by, for a pixel in the continuous tone region, generating a count of a number of same-valued pixels contiguous with the pixel, and if the count exceeds a strand size threshold, further detecting whether the same-valued, contiguous pixels form a long, elongated strand, and if the count exceeds the strand size threshold, classifying the pixel as text unless the same-valued, contiguous pixels are detected to form a long, elongated strand.

34. A computer-implemented method of decompressing a compressed data stream representing a mixed-mode image with text and continuous tone content, the compressed data stream containing a continuous tone segment in which continuous tone content for a region of the image is encoded using a compression type suitable for continuous tone content, the compressed data stream also containing a separate textual content segment in which text pixels detected as contiguous same-value pixel strands exceeding a size threshold from the image region are encoded using a compression type suitable for palettized image content, the method comprising:
  decoding the continuous tone segment to reconstruct continuous tone content of the image region;
  separately decoding the separate textual content segment to reconstruct the separated text pixels; and
  superimposing the separated text pixels onto the continuous tone content.

35. A mixed-mode image decoder for decoding a compressed data stream representing a mixed-mode image with text and continuous tone content, the compressed data stream containing a continuous tone segment in which continuous tone content for a region of the image is encoded using a compression type suitable for continuous tone content, the compressed data stream also containing a separate textual content segment in which text pixels detected as contiguous same-value pixel strands exceeding a size threshold from the image region are encoded using a compression type suitable for palettized image content, the decoder comprising:
  a demultiplexer operating to separate the separately encoded continuous tone and textual content segments from the compressed data stream;
  a palettized image decoder operating to decode the separate textual content segment to reconstruct the text pixels;
  a continuous tone image decoder operating to decode the continuous tone segment to reconstruct continuous tone content of the image region; and
  an image processor operating to superimpose the decoded text pixels over the reconstructed continuous tone content.

36. A computer-readable medium having computer-executable instructions stored thereon for decompressing a compressed data stream representing a mixed-mode image with text and continuous tone content, the compressed data stream containing a continuous tone segment in which continuous tone content for a region of the image is encoded using a compression type suitable for continuous tone content, the compressed data stream also containing a separate textual content segment in which text pixels detected as contiguous same-value pixel strands exceeding a size threshold from the image region are encoded using a compression type suitable for palettized image content, the method comprising:
  decoding the continuous tone segment to reconstruct continuous tone content of the image region;
  separately decoding the separate textual content segment to reconstruct the separated text pixels; and
  superimposing the separated text pixels onto the continuous tone content.

* * * * *